US012670232B2

(12) United States Patent
Tabet et al.

(10) Patent No.: US 12,670,232 B2
(45) Date of Patent: Jun. 30, 2026

(54) MODEL PREDICTION CONFIDENCE UTILIZING DRIFT

(71) Applicant: Dell Products, L.P., Round Rock, TX (US)

(72) Inventors: Said Tabet, Austin, TX (US); Jeffery White, Plano, TX (US); George Currie, Austin, TX (US); Xin Ma, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 1034 days.

(21) Appl. No.: 17/508,114

(22) Filed: Oct. 22, 2021

(65) Prior Publication Data

US 2023/0126842 A1 Apr. 27, 2023

(51) Int. Cl.
*G06F 18/21* (2023.01)
*G06F 11/07* (2006.01)
(Continued)

(52) U.S. Cl.
CPC ........ *G06F 18/2185* (2023.01); *G06F 11/079* (2013.01); *G06F 11/3419* (2013.01); *G06N 20/00* (2019.01)

(58) Field of Classification Search
CPC ........ G06N 20/00; G06N 20/20; G06N 3/045; G06N 3/08; G06N 5/025; G06N 5/04; G06N 7/01; G06N 5/00; G06N 5/01; G06N 5/022; G06N 5/048; G06F 11/079; G06F 11/0778; G06F 11/0772; G06F 11/0706; G06F 11/0793; G06F 2221/2151; G06F 11/0775; G06F 1/206;

G06F 1/3206; G06F 11/0709; G06F 11/302; G06F 1/324; G06F 11/0748; G06F 11/0766; G06F 11/0769; G06F 11/3051; G06F 11/3409; G06F 11/3438; G06F 11/3692; G06F 18/214; G06F 2201/81; G06F 2201/865; G06F 9/5083; G06F 1/20; G06F 1/3203;
(Continued)

(56) References Cited

U.S. PATENT DOCUMENTS

| 12,165,017 B1 * | 12/2024 | Grossman | ............... G06F 17/17 |
| 2012/0047581 A1 * | 2/2012 | Banerjee | ............... G06F 21/554 |
| | | | 726/23 |

(Continued)

OTHER PUBLICATIONS

Haque, et al., "Efficient handling of concept drift and concept evolution over Stream Data," 2016 IEEE 32nd International Conference on Data Engineering (ICDE), Helsinki, Finland, 2016, pp. 481-492, doi: 10.1109/ICDE.2016.7498264 (Year: 2016).*

(Continued)

*Primary Examiner* — Luis A Sitiriche
(74) *Attorney, Agent, or Firm* — Fogarty LLP

(57) ABSTRACT

Embodiments of systems and methods for model prediction confidence utilizing drift are described. In some embodiments, an Information Handling System (IHS) may include a processor and a memory coupled to the processor, the memory having program instructions stored thereon that, upon execution, cause the IHS to: identify drift with respect to an Artificial Intelligence (AI) or Machine Learning (ML) model; and adjust a confidence score of a prediction or inference produced by the AI/ML model based, at least in part, upon the drift.

20 Claims, 10 Drawing Sheets

(51) Int. Cl.
   *G06F 11/34* (2006.01)
   *G06N 20/00* (2019.01)

(58) Field of Classification Search
   CPC .... G06F 1/3209; G06F 1/3215; G06F 1/3296;
   G06F 11/0715; G06F 11/0751; G06F
   11/1446; G06F 11/1451; G06F 11/2023;
   G06F 11/2046; G06F 11/24; G06F 11/26;
   G06F 11/30; G06F 11/3072; G06F
   11/3433; G06F 11/3452; G06F 11/3672;
   G06F 16/21; G06F 21/552; G06F 21/554;
   G06F 2201/86; G06F 8/65; G06F 9/4831;
   G06F 9/5077; G06F 9/542; G06F 1/3243;
   G06F 11/004; G06F 11/0736; G06F
   11/0745; G06F 11/0787; G06F 11/14;
   G06F 11/3423; G06F 11/3476; G06F
   11/36; G06F 11/3688; G06F 15/167;
   G06F 16/2477; G06F 16/904; G06F
   18/217; G06F 18/2415; G06F 2201/835;
   G06F 2209/5019; G06F 9/5027; G06F
   9/5072; G06F 11/3419; G06F 18/2185
   See application file for complete search history.

(56) References Cited

U.S. PATENT DOCUMENTS

| | | | | |
|---|---|---|---|---|
| 2017/0330109 A1* | 11/2017 | Maughan | .................. | G06N 5/04 |
| 2019/0147357 A1* | 5/2019 | Erlandson | ............... | G06N 3/08 |
| | | | | 706/12 |
| 2020/0349249 A1* | 11/2020 | Weston | ................ | G06V 40/171 |
| 2021/0125104 A1* | 4/2021 | Christiansen | .......... | G06N 20/10 |
| 2021/0334695 A1* | 10/2021 | Raj | ..................... | G06F 11/3409 |
| 2022/0126864 A1* | 4/2022 | Moustafa | ........... | B60W 60/0011 |
| 2022/0156578 A1* | 5/2022 | Allahdadian | ........... | G06F 17/18 |
| 2022/0188694 A1* | 6/2022 | Suzani | ................... | G06F 17/18 |
| 2022/0400121 A1* | 12/2022 | Han | ........................ | G06N 20/00 |
| 2024/0020531 A1* | 1/2024 | Scepanski | .............. | G06N 3/105 |

OTHER PUBLICATIONS

Schörgendorfer, Angela, and Wilfried Elmenreich. "Extended confidence-weighted averaging in sensor fusion" na, 2006. (Year: 2006).*

* cited by examiner

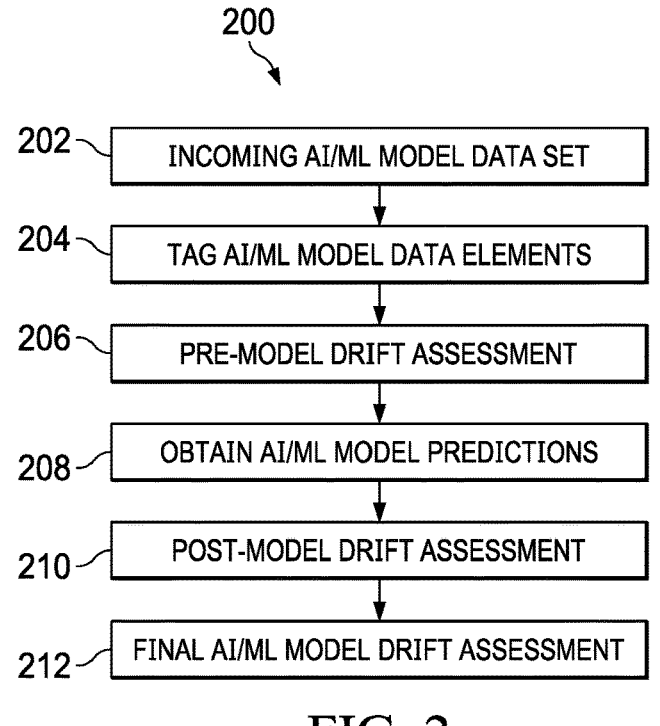

200

202 — INCOMING AI/ML MODEL DATA SET

204 — TAG AI/ML MODEL DATA ELEMENTS

206 — PRE-MODEL DRIFT ASSESSMENT

208 — OBTAIN AI/ML MODEL PREDICTIONS

210 — POST-MODEL DRIFT ASSESSMENT

212 — FINAL AI/ML MODEL DRIFT ASSESSMENT

FIG. 2

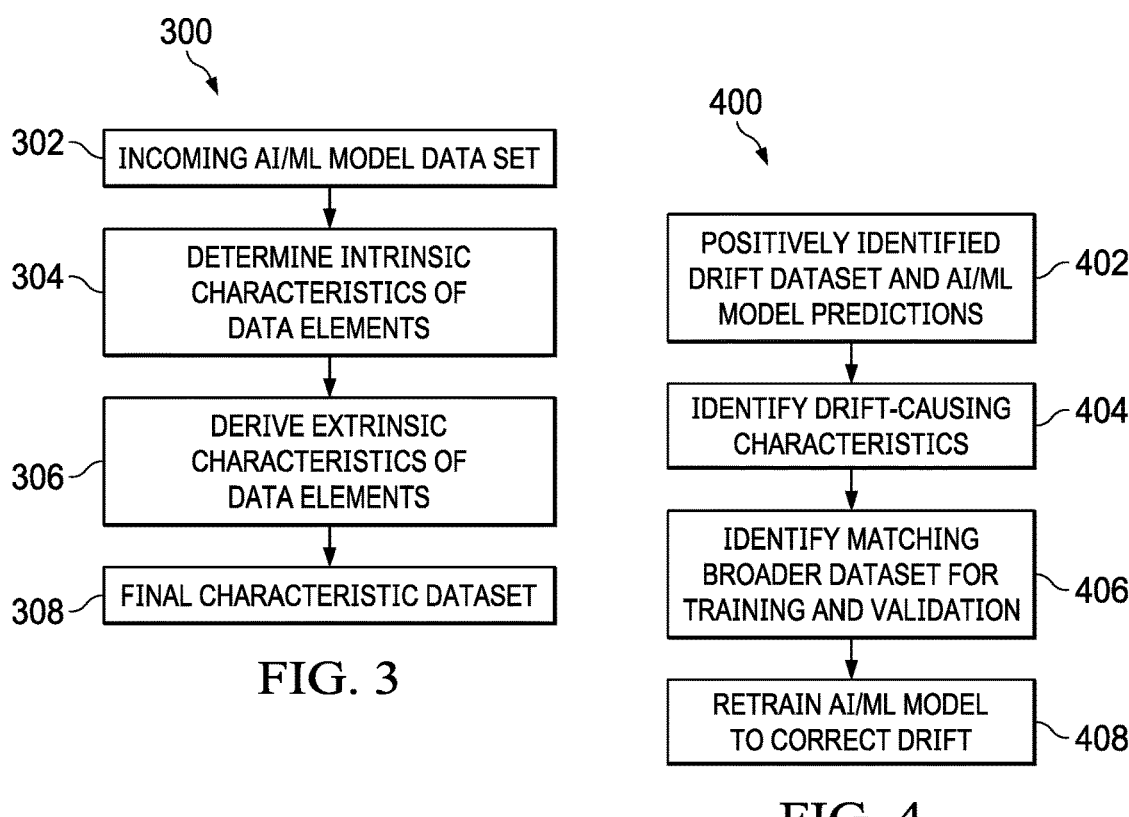

300

302 — INCOMING AI/ML MODEL DATA SET

304 — DETERMINE INTRINSIC CHARACTERISTICS OF DATA ELEMENTS

306 — DERIVE EXTRINSIC CHARACTERISTICS OF DATA ELEMENTS

308 — FINAL CHARACTERISTIC DATASET

402 — POSITIVELY IDENTIFIED DRIFT DATASET AND AI/ML MODEL PREDICTIONS

404 — IDENTIFY DRIFT-CAUSING CHARACTERISTICS

406 — IDENTIFY MATCHING BROADER DATASET FOR TRAINING AND VALIDATION

408 — RETRAIN AI/ML MODEL TO CORRECT DRIFT

1301 START

1302 DETECT OBSERVATION OVERLAP

1303 IDENTIFY CONSENSUS

1304 TAG DATA AS GROUND TRUTH

1305 END

MODEL PREDICTION CONFIDENCE UTILIZING DRIFT

FIELD

The present disclosure relates generally to Artificial Intelligence (AI) and Machine Learning (ML), and more particularly, to systems and methods for model prediction confidence utilizing drift.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information that can be derived from data. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for model prediction confidence utilizing drift are described. In various implementations, these systems and methods may relate to Artificial Intelligence (AI) or Machine Learning (ML) performance model drift detection and mitigation. AI/ML drift generally occurs when an AI/ML model statistically trained on a specific dataset experiences performance degradation in terms of its ability to inference based on the data objects being presented to the model having changed (data drift) and/or the meaning of the data objects having changed (concept drift). This is a major challenge in the application of AI/ML techniques in Information Handling Systems (IHSs), especially when such IHSs are deployed outside of data centers or local premises in Edge computing environments.

In an illustrative, non-limiting embodiment, an IHS may include a processor and a memory coupled to the processor, the memory having program instructions stored thereon that, upon execution, cause the IHS to: identify drift with respect to an AI/ML model; and adjust a confidence score of a prediction or inference produced by the AI/ML model based, at least in part, upon the drift.

The AI/ML model may include at least one of: a Linear Regression model, a Deep Neural Network model, a Logistic Regression model, a Decision Tree model, a Linear Discriminant Analysis model, a Naive Bayes model, a Support Vector Machines model, a Learning Vector Quantization model, a K-nearest Neighbors model, or a Random Forest model.

To identify the drift, the program instructions, upon execution, may cause the IHS to perform a pre-model analysis to calculate a first metric based, at least in part, upon a variance of input data with respect to an input data norm, where the input data norm is established in the absence of drift. Additionally, or alternatively, to identify the drift, the program instructions, upon execution, may cause the IHS to perform a post-model analysis to calculate a second metric based, at least in part, upon a variance of prediction or inference results with respect to a prediction or inference norm, where the prediction or inference norm is established in the absence of drift. Additionally, or alternatively, to identify the drift, the program instructions, upon execution, may cause the IHS to apply a first weight to the first metric, apply a second weight to the second metric, and calculate a weighted average of the first and second metrics.

In response to a determination that the AI/ML model is more susceptible to data drift than concept drift, the first weight may be greater than the second weight. In response to a determination that the AI/ML model is more susceptible to concept drift than data drift, the second weight may be greater than the first weight.

The program instructions, upon execution, may cause the IHS to enable a user to change at least one of the first or second weights to further adjust the confidence score.

To adjust the confidence score, the program instructions, upon execution, may cause the IHS to indicate that the prediction or inference not be trusted in response to a determination that the drift is greater than a threshold value. Additionally, or alternatively, to adjust the confidence score, the program instructions, upon execution, may cause the IHS to reduce the confidence score proportionally to the drift in response to a determination that the drift is greater than a threshold value. Additionally, or alternatively, to adjust the confidence score, the program instructions, upon execution, may cause the IHS to indicate that the prediction or inference be trusted in response to a determination that the drift is smaller than a threshold value.

Additionally, or alternatively, to adjust the confidence score, the program instructions, upon execution, may cause the IHS to increase the confidence score proportionally to the drift in response to a determination that the drift is smaller than a threshold value. Additionally, or alternatively, to adjust the confidence score, the program instructions, upon execution, may cause the IHS to enable a user to select by how much the drift affects the confidence score. The program instructions, upon execution, may cause the IHS to modify the prediction or inference based, at least in part, upon the drift.

In another illustrative, non-limiting embodiment, a hardware memory device may have program instructions stored thereon that, upon execution, cause an IHS to: calculate drift of an AI/ML model based, at least in part, upon a pre-model analysis and a post-model analysis; and modify a confidence of a prediction or inference made by the AI/ML model based, at least in part, upon the drift. In yet another illustrative, non-limiting embodiment, a method may include: calculating drift of an AI/ML model based, at least in part, upon a pre-model analysis and a post-model analysis; and modifying a prediction or inference made by the AI/ML model based, at least in part, upon the drift.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 2 is a diagram of an example of a method for assessing the drift of data for an Artificial Intelligence (AI) or Machine Learning (ML) model, according to some embodiments.

FIG. 3 is a diagram of an example of a method for determining intrinsic and extrinsic characteristics of AI/ML model data for drift analysis, according to some embodiments.

FIG. 4 is a diagram of an example of a method for automated training and validation set identification for drift analysis, according to some embodiments.

DETAILED DESCRIPTION

Figure 1:
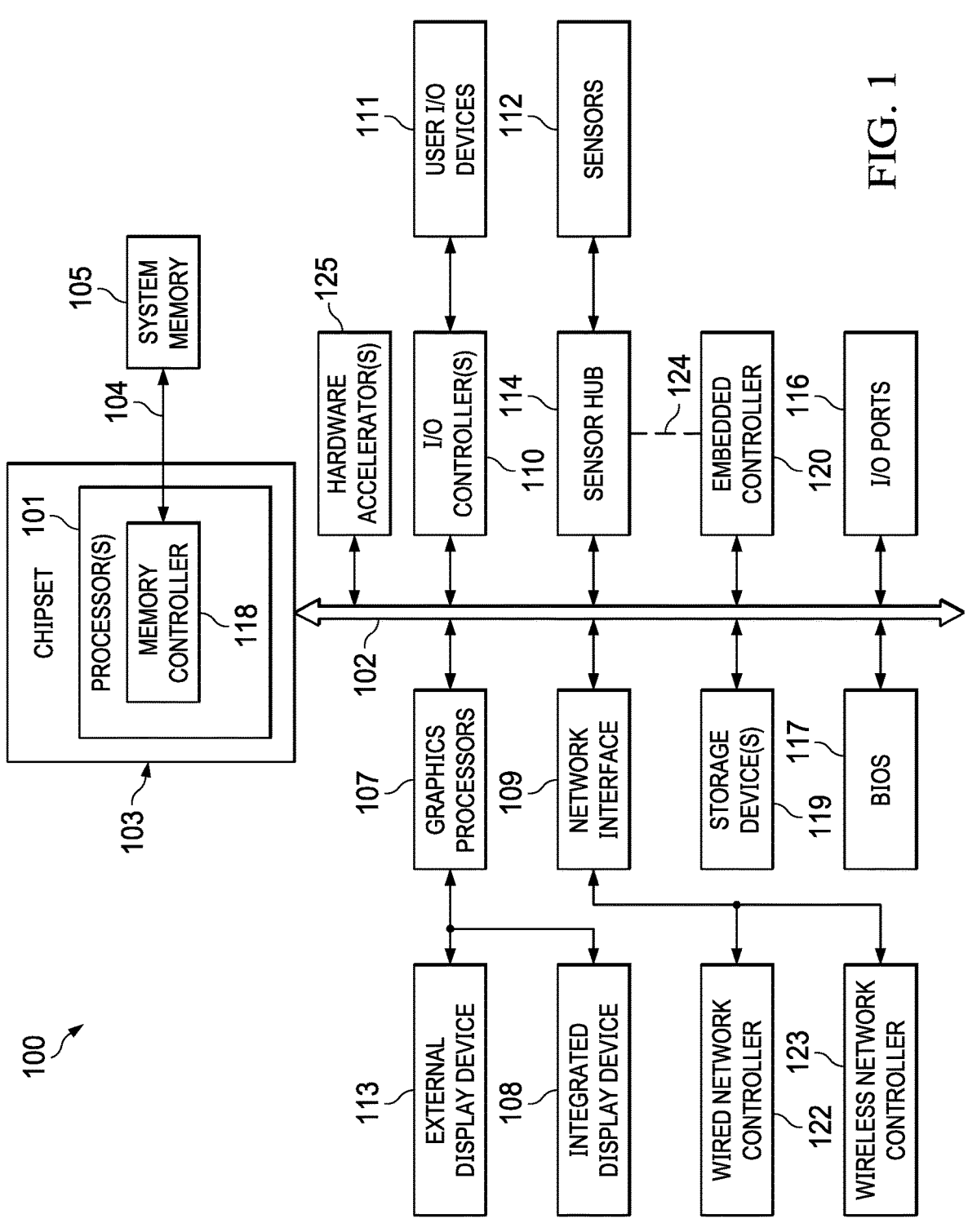
FIG. 1 is a diagram of an example of hardware components of an Information Handling System (IHS), according to some embodiments.

As the number and complexity of Artificial Intelligence (AI) and Machine Learning (ML) models grow, the task of monitoring their performance becomes increasingly difficult. Conventional model monitoring methods require a significant amount of human intervention, which restricts the number of models that may be effectively monitored, the efficacy of their monitoring, and our ability to remediate problems.

One type of AI/ML model problem is referred to as "drift." There are two types of AWL model drift: "data drift" and "concept drift." Data drift occurs when the input data presented to the model model has changed from the training set, such that it negatively impacts the model's ability to perform inferences, predictions, and/or interpretations. Concept drift occurs when the input data remains the same yet its semantic meaning changes over time, thus also leading to a failure in inferences, predictions, and/or interpretations. In many applications, any type of drift can cause an AI/ML model's performance to deteriorate rapidly.

Existing drift detection techniques require so-called "ground truth" data. To detect drift, inferences made by an AI/ML model with actual input data are compared to inferences made with ground truth data, and discrepancies between the two are usable indicators of drift. While annotated ground truth labels may be available in certain situations, however, real-world data typically does not have ground truth labels associated with them. In some cases, it may be preferable to utilize model drift detection techniques that are not dependent on having ground truth labeled data available. In other cases, it may be advantageous to create ground truth tags for data that has not otherwise been tagged as such.

After drift has been detected, factors in the drift-inducing dataset that are the primary cause of drift may be identified. This may be accomplished by examination of the drift-inducing dataset to discern which factors are likely to be drift inducers. When done manually, this process is time consuming, and its efficacy depends on the person performing the analysis. Moreover, once drift inducing factors have been identified, the AI/ML model may be re-trained with a broader dataset that contains similar characteristics as the drift inducing dataset. As such, the ability to select training data based upon identified data characteristics, attributes, or tags is critical for facilitating the automated management of an AI/ML model's lifecycle.

Against this backdrop, systems and methods described herein disclose numerous embodiments that are generally applicable to AI/ML technology, and specifically applicable to AI/ML model lifecycle management. For example, these systems and methods may be used to calculate the prediction confidence of an AI/ML model using drift. Additionally, or alternatively, these systems and methods may enable unsupervised data characterization using drift models. Additionally, or alternatively, these systems and methods may generate multi-observer, consensus-based ground truth tags. Additionally, or alternatively, these systems and methods may generate rich attributes for the automated identification of training datasets. Yet additionally, or alternatively, these systems and methods may perform drift remediation using causal methods.

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a CPU or hardware or software control logic, Read-Only Memory (ROM), and/ or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

FIG. 1 is a block diagram illustrating components of an example of IHS 100, according to some embodiments. As shown, IHS 100 includes one or more main or host processor(s) 101, such as a Central Processing Unit (CPU), that executes code retrieved from system memory 105. Although IHS 100 is depicted with a single processor, other embodiments may include two or more processors, that may each be configured identically, or to provide specialized processing operations. Processor(s) 101 may include any processor capable of executing instructions, such as an Intel Pentium™ series processor or any general-purpose or embedded processors implementing any of a variety of Instruction Set Architectures (ISAs), such as the x86, POW-ERPC®, ARM®, SPARC®, or MIPS® ISAs, or any other suitable ISA.

In the embodiment of FIG. 1, processor(s) 101 includes integrated memory controller 118 that may be implemented directly within its circuitry. Alternatively, memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 is coupled to processor(s) 101 and provides processor(s) 101 with a high-speed memory that may be used in the execution of computer program instructions. For example, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile, and volatile memor(ies). In certain embodiments, system memory 105 may include multiple removable memory modules.

IHS 100 utilizes chipset 103 that may include one or more integrated circuits coupled to processor(s) 101. In this embodiment, processor(s) 101 is depicted as a component of chipset 103. In other embodiments, all of chipset 103, or portions of chipset 103 may be implemented directly within the integrated circuitry of processor(s) 101. Chipset 103 provides processor(s) 101 with access to a variety of resources accessible via bus 102.

In IHS 100, bus 102 is illustrated as a single element. However, other embodiments may utilize any number of separate buses to provide the illustrated pathways served by bus 102. In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to, or instead of USB ports, I/O ports 116 may include various types of physical I/O ports that are accessible to a user via an enclosure or chassis of IHS 100.

In certain embodiments, chipset 103 may additionally utilize one or more I/O controllers 110 that may each support the operation of hardware components such as user I/O devices 111. User I/O devices 111 may include peripheral components that are physically coupled to I/O port 116 and/or peripheral components wirelessly coupled to IHS 100 via network interface 109.

In some implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

A variety of additional resources may be coupled to processor(s) 101 of IHS 100 through chipset 103. For instance, chipset 103 may be coupled to network interface 109 to enable different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE).

Network interface 109 may support network connections by wired network controller(s) 122 and wireless network controller(s) 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor(s) 107. Graphics processor(s) 107 may be included within a video card, graphics card, and/or an embedded controller installed within IHS 100. Additionally, or alternatively, graphics processor(s) 107 may be integrated within processor(s) 101, such as a component of a system-on-chip (SoC). Graphics processor(s) 107 may generate display information and provide the generated information to display device(s) 108 and/or 113.

One or more display devices 108 and/or 113 are coupled to IHS 100 and may utilize LCD, LED, OLED, or other display technologies (e.g., flexible displays, etc.). Each display device 108 and 113 may be capable of receiving touch inputs such as via a touch controller that may be an embedded component of the display device 108 and/or 113 or graphics processor(s) 107, for example, or may be a separate component of IHS 100 accessed via bus 102. In some cases, power to graphics processor(s) 107, integrated display device 108 and/or external display 113 may be turned off or configured to operate at minimal power levels in response to IHS 100 entering a low-power state (e.g., standby).

As illustrated, IHS 100 may support integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100, via wireless docking station, etc. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor(s) 101 with access to one or more storage devices 119. In various embodiments, storage device 119 may be integral to IHS 100 or may be external to IHS 100. Moreover, storage device 119 may be accessed via a storage controller that may be an integrated component of the storage device.

Generally, storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. Under execution, BIOS 117 instructions may facilitate the loading of an Operating System (OS) (e.g., WINDOWS, MACOS, iOS, ANDROID, LINUX, VXWORKS, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Certain IHS 100 embodiments may utilize sensor hub 114 (e.g., INTEL Sensor Hub or "ISH," etc.) capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle (e.g., hinge angle), deformation, bending (e.g., of a flexible display), orientation, movement, velocity, rotation, acceleration, bag state (in or out of a bag), and/or lid sensor(s) (open or closed).

One or more sensors 112 may be part of a keyboard or other input device. Processor(s) 101 may be configured to process information received from sensors 112 through sensor hub 114. Sensor hub 114 may be an independent microcontroller or other logic unit that is coupled to the motherboard of IHS 100. Sensor hub 114 may be a component of an integrated SoC incorporated into processor(s) 101, and it may communicate with chipset 103 via a bus connection such as an Inter-Integrated Circuit (I²C) bus or other suitable type of bus connection. Sensor hub 114 may also utilize an I²C bus for communicating with various sensors supported by IHS 100.

IHS 100 may utilize Embedded Controller (EC) 120, which may be a motherboard component of IHS 100 and may include one or more logic units. In certain embodiments, EC 120 may operate from a separate power plane from the main/host processor(s) 101 and thus the OS operations of IHS 100. Firmware instructions utilized by EC 120 may be used to operate a secure execution system that may include operations for power management and/or management of operating modes in which IHS 100 may be physically configured and support for certain integrated I/O operations. In some embodiments, EC 120 and sensor hub 114 may communicate via an out-of-band signaling pathway or bus 124.

Chipset 103 may also provide processor 101 with access to hardware accelerator(s) 125, sometimes disposed on an accelerator tray deployed within the chassis of IHS 100. Instances of accelerator(s) 125 include, but are not limited to: Graphics Processing Units (GPUs), Field Programmable Gate Arrays (FPGAs), Intelligence Processing Units (IPUs), Data Processing Units (DPUs), Gaussian Neural Accelerators (GNAs), Audio and Contextual Engines (ACEs), Vision Processing Units (VPUs), etc. Additionally, or alternatively, one or more hardware accelerators may be virtualized (e.g., vGPU). In some embodiments, hardware accelerator(s) 125 may be configured to execute AI/ML models or workloads offloaded by processor(s) 101.

In various embodiments, IHS 100 may not include each of the components shown in FIG. 1. Moreover, IHS 100 may include various other components in addition to those that are shown in FIG. 1. Some components that are represented as separate components in FIG. 1 may be integrated with other components. For example, in some implementations, all or a portion of the features provided by the illustrated components may instead be provided by an SoC.

Detection and Remediation of AI/ML Model Drift

Systems and methods described herein are directed to autonomic detection and correction of AI/ML model drift. The occurrence of AI/ML model drift may be identified utilizing an unsupervised approach in which the data feeding the AI/ML model is analyzed and/or the metrics of the AI/ML model is analyzed. In either approach, once drift is detected, the data which induced the drift is analyzed to create a set of rich metadata to identify characteristics of the drift-inducing data. This metadata is then compared to the broader data set to identify appropriate data to retrain models experiencing drift. Once retrained, the AI/ML, models are then tested against multiple datasets to validate the desired level of AI/ML model performance.

These systems and methods may allow for the fully automated lifecycle management of an AI/ML model that is being negatively influenced by model drift. Data coming into the system is automatically tagged by one or more special purpose processors to analyze the incoming data and assign metadata tags based on the outcomes of the analysis. Once tagged, a pre-model drift analysis is performed to analyze the incoming data, such as by using one or more unsupervised techniques to identify data that is likely to cause model drift or in other suitable manner. Regardless of the outcome of the analysis, the data is then allowed to run through the AI/ML model. Post-model drift analysis may then be performed on the model predictions to determine if drift has occurred. This drift detection process may be performed by statistical analysis of object detection and object recognition rates and performing statistical tests to determine if the model process is in statistically stationary operation. The model may be treated as a stochastic process and analyzed mathematically to determine effectiveness of operation. If the model begins to depart from stationary operation, it may be identified as being potentially impacted by drift.

These systems and methods leverage pre-model or post-model analysis to identify possible drift, and one or more drift factor analyzers may be utilized to identify specific characteristics of either the incoming dataset or the observed model output to identify specific drift inducing aspects if drift might be occurring. Once any drift inducing aspects have been identified, the global dataset may then be automatically queried to identify a suitable training set to correct the AI/ML model and the AI/ML model may then be re-trained.

In an example embodiment, systems and methods described herein may approach drift detection using an ensemble approach rather than a monolithic task. First, the incoming dataset may be analyzed for variances from a determined norm. This determined norm may be established by identifying data for which no drift was identified and whose model performance is identified as having a high level of quality. Second, the predictions made by the model on the dataset may be analyzed against a determined norm for prediction results. Once both pre- and post-model analyses are complete, an overall determination of the presence of model drift may be calculated.

In another example embodiment, once model drift has been detected, the characteristics of the dataset that instigated the drift may be utilized to identify data from the broader dataset that contains similar characteristics. Other static characteristics may also be utilized, such as whether the dataset is the newest data and so forth.

In another example embodiment, intrinsic characteristics may be explicitly observed in either the dataset that is provided to the model, based on the predictions of the model or in other suitable manner. This approach introduces the notion of "extrinsic" characteristics that are based on information inferred or referenced based on intrinsic characteristics. For example, the weather conditions at a GPS location (intrinsic) at a particular time (intrinsic) may be queried via a third-party source (such as the National Weather Service) to determine the weather conditions at the time and location. These extrinsic characteristics may provide additional insights into conditions that may potentially affect model performance, but which are not ascertainable directly from the data itself.

FIG. 2 is a diagram of an example of method 200 for assessing the drift of data for an AI/ML model, according to some embodiments. Method 200 may be implemented in hardware or a suitable combination of hardware and software. Particularly, method 200 begins at 202, where an incoming data set is received. In an example embodiment, the incoming data set may be periodically received, such as by generating image data in a moving vehicle or in other suitable manner. Method 200 then proceeds to 204.

At 204, data items in the incoming data set are tagged by a processor that has been configured to tag the data items for drift analysis based on one or more algorithmic processes that identify tags from the data item as an object, the type of file associated with the data item, the contents of the file, from external sources or in other suitable manner that may allow the tags to be used for drift analysis. Method 200 then proceeds to 206.

At 206, a pre-model drift assessment is performed by a processor that has been configured to identify tagged data that is associated with drift, such as by comparing variations in the tagged data with variations in the data that was used to create an AI/ML model or in other suitable manner. Method 200 then proceeds to 208.

At 208, model predictions are obtained by a processor that has been configured to determine the expected results from processing the incoming data set. In an example, embodiment, when the tagged data is determined to have one or more characteristics that fall outside of an expected range, a prediction on the outcome of processing the incoming data set with the AI/ML model may be determined, such as a "pass" or "fail" prediction, a "drift" or "no-drift" prediction or other suitable predictions. Method 200 then proceeds to 210.

At 210, a post model drift assessment is performed, such as by a processor that has been configured to compare the results of processing of the incoming data set by the AI/ML model with the predicted results or in other suitable manner. Method 200 then proceeds to 212.

At 212, a final drift assessment is performed, such as by a processor that has been configured to obtain verification of drift of the incoming data set from one or more additional sources or in other suitable manner. Method 200 then terminates.

In operation, method 200 allows drift of an incoming data set for an AI/ML model to be assessed. While method 200 is shown as a flowchart, a person of ordinary skill in the art will recognize that method 200 may also or alternatively be implemented using object-oriented programming, state diagrams, ladder diagrams, or other suitable manner.

FIG. 3 is a diagram of an example of method 300 for determining intrinsic and extrinsic characteristics of AI/ML model data for drift analysis, according to some embodiments. Method 300 may be implemented in hardware or a suitable combination of hardware and software. Particularly, method 300 begins at 302, where an incoming data set is received. In an example embodiment, the incoming data set may be periodically received, such as by generating image data in a moving vehicle or in other suitable manner. Method 300 then proceeds to 304.

At 304, intrinsic characteristics of the incoming data set are determined. In an example embodiment, a processor may be used to process the incoming data set, where the processor has been configured using one or more methods to identify intrinsic characteristics of the incoming data set based on one or more algorithmic processes that identify data items of the incoming data set as objects, the type of file associated with the data item or the incoming data set, the contents of the file or the incoming data set, external sources associated with the incoming data set or in other suitable manner. Method 300 then proceeds to 306.

At 306, extrinsic characteristics of the incoming data set are derived. In an example embodiment, a processor may be used to process the incoming data set and the intrinsic characteristics of the incoming data set to obtain extrinsic data from an external source, such as based on one or more algorithmic processes that identify relevant external sources based on the incoming data set and the intrinsic data or in other suitable manner. Method 300 then proceeds to 308.

At 308, a final characteristic data set is obtained. In an example embodiment, the intrinsic and extrinsic data sets may be combined with the incoming data set or other suitable processes may also or alternatively be used. Method 300 then terminates.

In operation, method 300 allows intrinsic and extrinsic characteristics of AI/ML model data to be determined for use in drift analysis. While method 300 is shown as a flowchart, a person of ordinary skill in the art will recognize that method 300 may also or alternatively be implemented using object-oriented programming, state diagrams, ladder diagrams, or in other suitable manner.

FIG. 4 is a diagram of an example of method 400 for automated training and validation set identification for drift analysis, according to some embodiments. Method 400 may be implemented in hardware or a suitable combination of hardware and software. Particularly, method 400 begins at 402, where a positively identified drift data set and model predictions are created. In an example embodiment, the data set and model predictions may be stored in a database to allow the data set to be processed to determine whether the model predictions are accurate or for other suitable purposes. Method 400 then proceeds to 404.

At 404, drift-causing characteristics of the data set are identified. In an example embodiment, tagged data may be analyzed and compared with tagged data of other data sets that experienced drift, tagged data of other data sets that did not experience drift or other suitable data, such as to identify subsets of data that may be monitored to detect drift or potential drift. The method then proceeds to 406.

At 406, matching broader data sets are identified for training and validation. In an example embodiment, data sets may be used to improve an AI/ML model, may be used to select an appropriate AI/ML model, or for other suitable purposes associated with AI/ML model training and validation to avoid drift in AI/ML model processing of data sets. Method 400 then proceeds to 408.

At 408, the AI/ML model is retrained to improve the ability to detect, correct and/or prevent drift. In an example embodiment, the new AI/ML model may be saved, a separate AI/ML model may be created for use with specific data sets or other suitable processes may also or alternatively be used. Method 400 then terminates.

In operation, method 400 allows for automated training and validation set identification for drift analysis associated with AI/ML model processing. While method 400 is shown as a flow chart, a person of ordinary skill in the art will recognize that method 400 may also or alternatively be implemented using object-oriented programming, state diagrams, ladder diagrams, or in other suitable manner.

Figure 5:
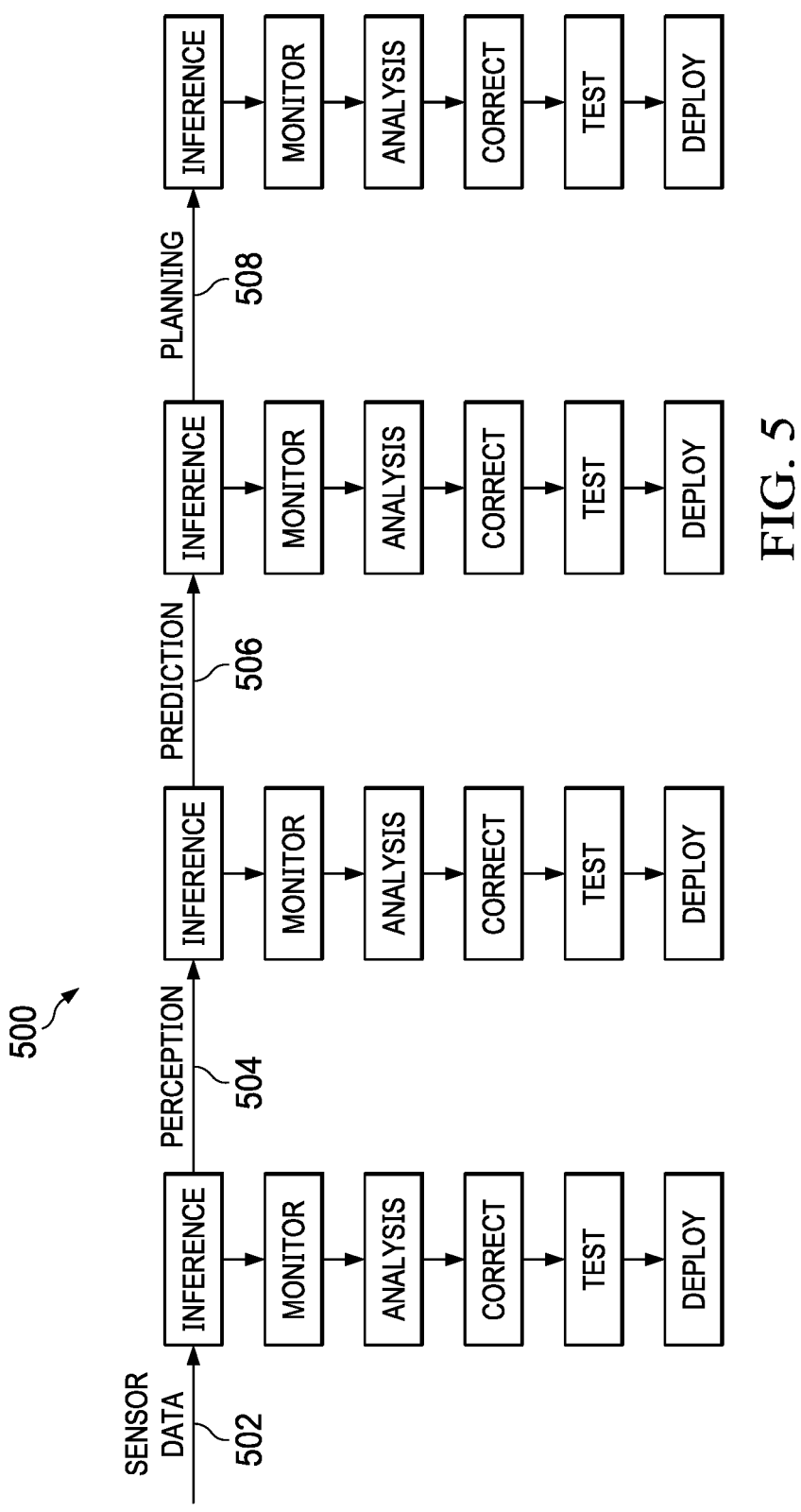
FIG. 5 is a diagram of an example of a system for AI/ML service management for drift analysis, according to some embodiments.

FIG. 5 is a diagram of an example of system 500 for AI/ML service management for drift analysis, according to some embodiments. System 500 includes sensor data processor 502, perception processor 504, prediction processor 506, and planning processor 508, each of which may be implemented in hardware or a suitable combination of hardware and software.

Sensor data processor 502 may be implemented as one or more algorithms loaded from a data memory device into working memory of a processor, which cause the processor to perform a series of processes for detecting drift in an AI/ML model based on sensor data. In an example embodiment, the processes may include an inference process, such as where sensor data is processed to generate inference data. Sensor data processor 502 may further include a monitor process, where a safety layer monitors statistical properties of inference accuracy to detect non-stationary performance. Sensor data processor 502 may further include an analysis process, where data is acquired for analysis upon detection. Sensor data processor 502 may further include a correction process, where remediation action, relabel or algorithm, then retrain regimen, and human intervention. Sensor data processor 502 may further include a test process which may test and validate a new AI/ML model. Sensor data processor 502 may further include a deployment process for use with sensor data, where a new AI/ML model is submitted to inventory for deployment. Sensor data processor 502 may also or alternatively generate a data output for use by perception processor 504.

Perception processor 504 may be implemented as one or more algorithms loaded from a data memory device into working memory of a processor, which cause the processor to perform a series of processes for detecting drift in an AI/ML model based on processed sensor data. In an example embodiment, the processes may include an inference process, a monitor process, an analysis process, a correction process, a test process, and/or a deployment process for use with processed sensor data, each of which may be coordinated with associated processes of sensor data processor 502. Perception processor 504 may also or alternatively generate a data output for use by prediction processor 506.

Prediction processor 506 may be implemented as one or more algorithms loaded from a data memory device into working memory of a processor, which cause the processor to perform a series of processes for detecting drift in an AI/ML model based on data output by perception processor 504. In an example embodiment, the processes may include an inference process, a monitor process, an analysis process, a correction process, a test process and a deployment process for use with sensor data, each of which may be coordinated with associated processes of sensor data processor 502 and perception processor 504. Prediction processor 506 may also or alternatively generate a data output for use by planning processor 508.

Planning processor 508 may be implemented as one or more algorithms loaded from a data memory device into working memory of a processor, which cause the processor to perform a series of processes for detecting drift in an AI/ML model based on data output by prediction processor 506. In an example embodiment, the processes may include an inference process, a monitor process, an analysis process, a correction process, a test process, and/or a deployment process for use with sensor data, each of which may be coordinated with associated processes of sensor data processor 502, perception processor 504, and/or prediction processor 506.

Figure 6:
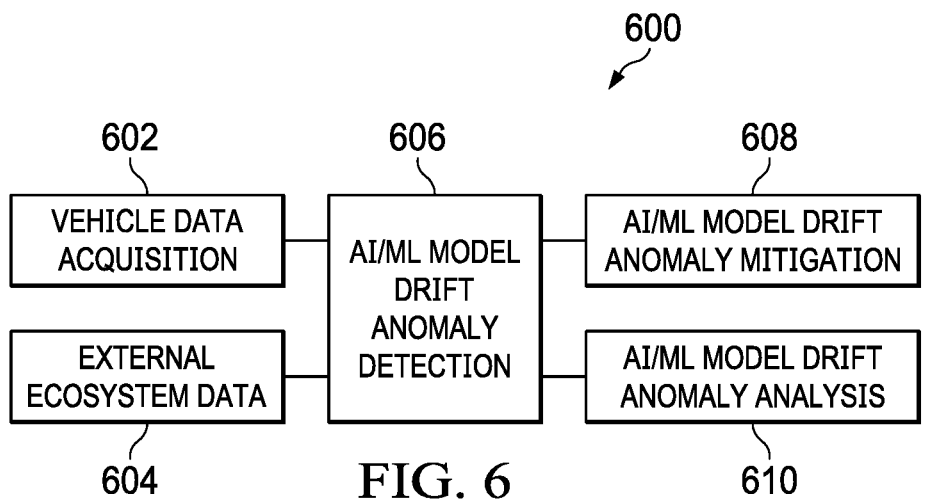
FIG. 6 is a diagram of an example of a system for drift analysis, according to some embodiments.

FIG. 6 is a diagram of an example of system 600 for drift analysis, according to some embodiments. System 600 includes vehicle data acquisition 602, external ecosystem data 604, anomaly detection 606, anomaly mitigation 608 and anomaly analysis 610, each of which may be implemented in hardware or a suitable combination of hardware and software.

Vehicle data acquisition 602 may be implemented as one or more algorithms loaded from a data memory device into working memory of a processor, which cause the processor to perform acquisition of vehicle data sets, such as a sequence of image data sets, control data sets, acceleration data sets, direction data sets or other suitable data sets. In an example embodiment, the data sets may include a plurality of data items such as data objects, data files or other suitable data structures. While vehicle data acquisition 602 is shown in this example embodiment, data acquisition for use with other AI/ML models may also or alternatively be used, such as web browsing data acquisition, crowd monitoring data acquisition, financial transaction data acquisition, or other suitable data acquisition.

External ecosystem data 604 may be implemented as one or more algorithms loaded from a data memory device into working memory of a processor, which cause the processor to perform acquisition of external ecosystem data, such as a sequence of image data from roadside cameras, weather data, data from other vehicles or other suitable data. In an example embodiment, the data sets may include a plurality of data items such as data objects, data files or other suitable data structures.

Anomaly detection 606 may be implemented as one or more algorithms loaded from a data memory device into working memory of a processor, which cause the processor to perform anomaly detection of data sets received from vehicle data acquisition 602 and external ecosystem data 604 and to generate data for use by anomaly mitigation 608 and anomaly analysis 610. In an example embodiment, anomaly detection 606 may receive feedback data from anomaly mitigation 608 and anomaly analysis 610 and may iteratively adjust the anomaly detection processing. In this example embodiment, anomaly detection 606 may detect a suspected anomaly based on data sets received from vehicle data acquisition 602 and external ecosystem data 604 and may provide the data to anomaly analysis 610 to determine whether the anomaly would result in drift in an AI/ML model. If the anomaly does not result in drift, then anomaly detection 606 may be modified to improve the anomaly detection processing; but if drift would result, anomaly mitigation 608 may be used to determine mitigation processing for the anomaly, such as additional data sets that may be used to resolve the anomaly, different AI/ML models that may be used to process the anomaly, training of AI/ML models to address the anomaly, or other suitable mitigation processing.

Anomaly mitigation 608 may be implemented as one or more algorithms loaded from a data memory device into working memory of a processor, which cause the processor to perform anomaly mitigation processing for data sets with identified anomalies, to prevent drift in AI/ML model processing. In an example embodiment, anomaly mitigation 608 may identify additional processing for the data to mitigate the anomaly, such as data filtering, data processing or other suitable operations to be performed on the data to resolve the anomaly. In another example embodiment, anomaly mitigation 608 may select different AI/ML models for use with the data set associated with the anomaly, may train an existing AI/ML model to properly process the data set associated with the anomaly, or may perform other suitable processes.

Anomaly analysis 610 may be implemented as one or more algorithms loaded from a data memory device into working memory of a processor, which cause the processor to perform analysis of data sets associated with an anomaly to determine whether additional processing by anomaly mitigation 608 is needed, whether modification of anomaly detection 606 is needed, or other suitable processing. In an example embodiment, anomaly analysis 610 may identify whether drift will occur in an AI/ML model using a data set and may implement corrective processes if drift occurs.

Figure 7:
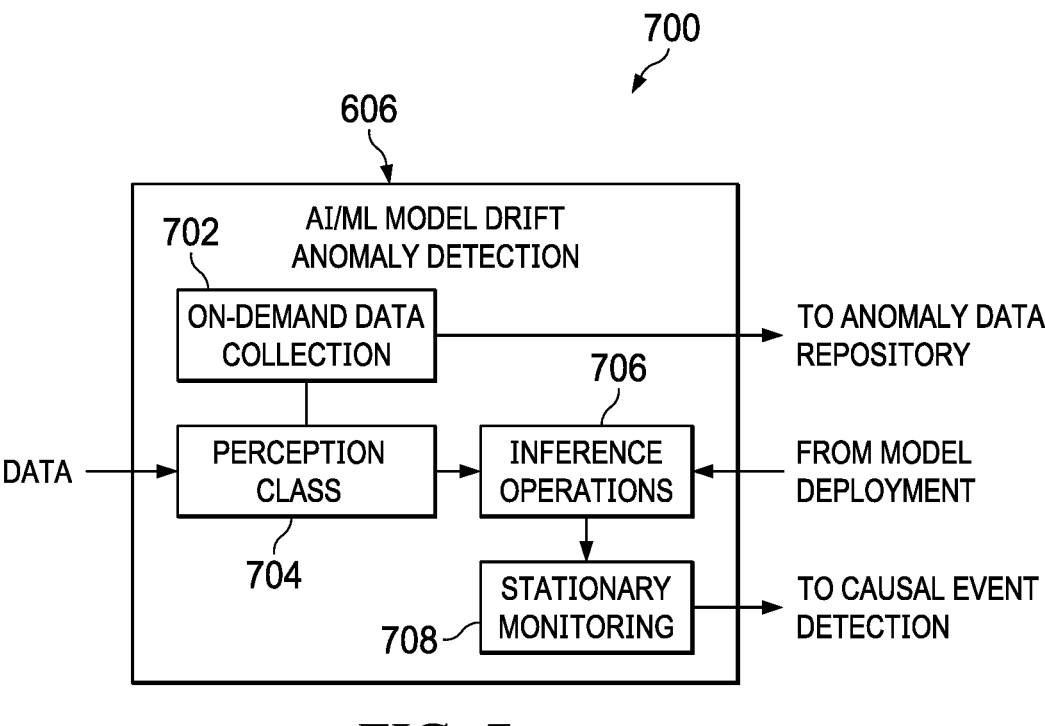
FIG. 7 is a diagram of an example of a system for anomaly detection for drift analysis, according to some embodiments.

FIG. 7 is a diagram of an example of system 700 for anomaly detection for drift analysis, according to some embodiments. System 700 refers to anomaly detection 606 of FIG. 6, and it includes on-demand data collection 702, perception classification 704, inference operations 706, and stationary monitoring 708, each of which may be implemented in hardware or a suitable combination of hardware and software.

On-demand data collection 702 may be implemented as one or more algorithms loaded from a data memory device into working memory of a processor, which cause the processor to perform on-demand data processing for drift analysis and mitigation. In an example embodiment, on-demand data collection may be performed to obtain data from a vehicle data acquisition system, a non-vehicle data acquisition system, a web-based data acquisition system, a camera-based data acquisition system, a radar-based data acquisition system, a Light Detection and Ranging (LIDAR) data acquisition system, a satellite-based data acquisition system, or other suitable data acquisition systems.

Perception classification 704 may be implemented as one or more algorithms loaded from a data memory device into working memory of a processor, which cause the processor to perform perception classification processing on data, such as image data, audio data or other suitable data. In an example embodiment, perception classification 704 may continuously process data that is received from vehicle data acquisition 602, external ecosystem data 604, or other suitable sources.

Inference operations 706 may be implemented as one or more algorithms loaded from a data memory device into working memory of a processor, which cause the processor to perform inference processing on data received from perception classification 704, such as to generate inference data for stationary monitoring 708 or other suitable data. Inference operations 706 may receive model deployment data to implement a new AI/ML model or other suitable data.

Stationary monitoring 708 may be implemented as one or more algorithms loaded from a data memory device into working memory of a processor, which cause the processor to perform stationary monitoring processing of data received from inference operations 706 or other suitable data. In an example embodiment, stationary monitoring 708 may generate an output for causal event detection or other suitable outputs.

Figures 8, 10:
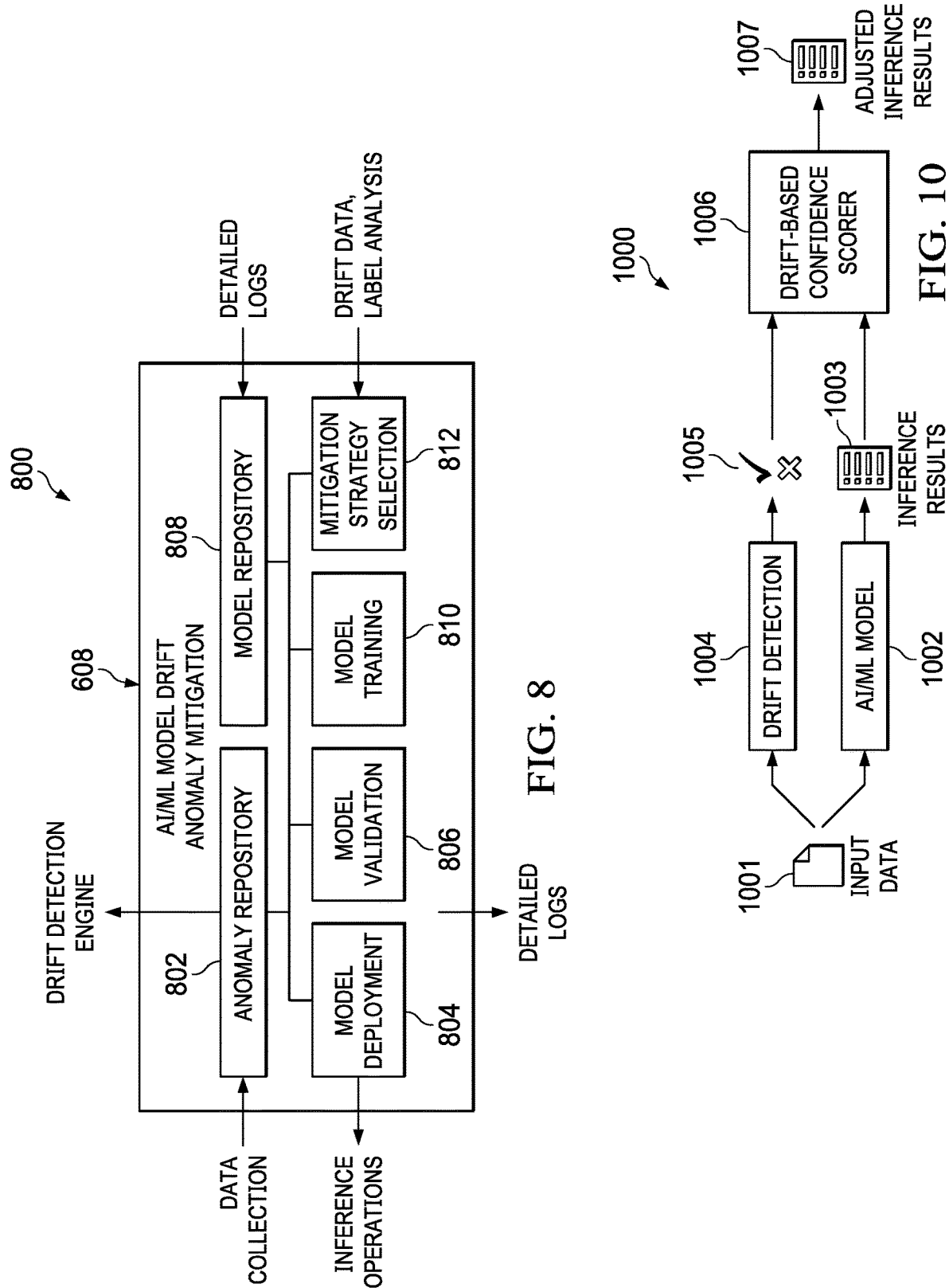
FIG. 8 is a diagram of an example of a system for anomaly mitigation for drift analysis, according to some embodiments.
FIG. 10 is a diagram of an example of a method for calculating AI/ML model prediction confidence using drift, according to some embodiments.

FIG. 8 is a diagram of an example of system 800 for anomaly mitigation for drift analysis, according to some embodiments. System 800 refers to anomaly mitigation 608 of FIG. 6, and it includes anomaly repository 802, model deployment 804, model validation 806, model repository 808, model training 810 and mitigation strategy selection 812, each of which may be implemented in hardware or a suitable combination of hardware and software.

Anomaly repository 802 may be implemented as one or more algorithms loaded from a data memory device into working memory of a processor, which cause the processor to perform perception anomaly data metadata repository searching, storing, and processing. In an example embodiment, anomaly repository 802 may be configured to receive data from on-demand data collection 602, to determine whether the data contains anomalies and to generate an output to drift detection engine 806 to perform drift detection processing in response to detected anomalies, or other suitable operations.

Model deployment 804 may be implemented as one or more algorithms loaded from a data memory device into working memory of a processor, which cause the processor to perform model deployment processing, such as to deploy a new AI/ML model or for other suitable purposes. In an example embodiment, model deployment 804 may receive a validated AI/ML model from model validation 806 and may deploy the validated model to inference operations 606 or other suitable systems.

Model validation 806 may be implemented as one or more algorithms loaded from a data memory device into working memory of a processor, which cause the processor to perform AI/ML model validation to correct for detected drift or other suitable operations. In an example embodiment, model validation 806 may receive AI/ML model data from model repository 808 and model training data from model training 810 and may validate the model, such as by providing scoring data to model training 810, and by iteratively interfacing with model training 810 to obtain data sets, data streams and data classification, for additional data collection and data characterization, to obtain or update bias algorithm parameters, to obtain scoring errors, for versioning or for other suitable operations.

Model repository 808 may be implemented as one or more algorithms loaded from a data memory device into working memory of a processor, which cause the processor to perform model repository storage and retrieval and associated processing. In an example embodiment, model repository 808 may receive and process data sets, data streams and data classification associate with AI/ML models to correct for drift, may process additional data collection and data characterization that is associated with AI/ML models to correct for drift, to obtain or update bias algorithm parameters to correct drift in AI/ML models, to obtain scoring errors for determining and assessing drift, for versioning of models, and/or for other suitable purposes. Model repository 808 may be configured to receive data from detailed logs of anomaly tracking 804, mitigation strategy selection 812, and model validation 806, to provide data to model training 810 and mitigation strategy selection 812 and to perform other suitable operations.

Model training 810 may be implemented as one or more algorithms loaded from a data memory device into working memory of a processor, which cause the processor to perform AI/ML model training to correct for drift or other suitable operations. In an example embodiment, model training 810 may receive data from model repository 808, mitigation strategy selection 812, model validation 806, anomaly repository 802, or other suitable data, and it may provide data to mitigation strategy selection 812, model validation 806 and other suitable systems, for AI/ML model training to correct for drift.

Mitigation strategy selection 812 may be implemented as one or more algorithms loaded from a data memory device into working memory of a processor, which cause the processor to perform mitigation strategy selection for correcting AI/ML models for drift. In an example embodiment, mitigation strategy selection 812 may provide mitigation strategy selection data to model repository 808, model training 810 and other suitable systems.

Figure 9:
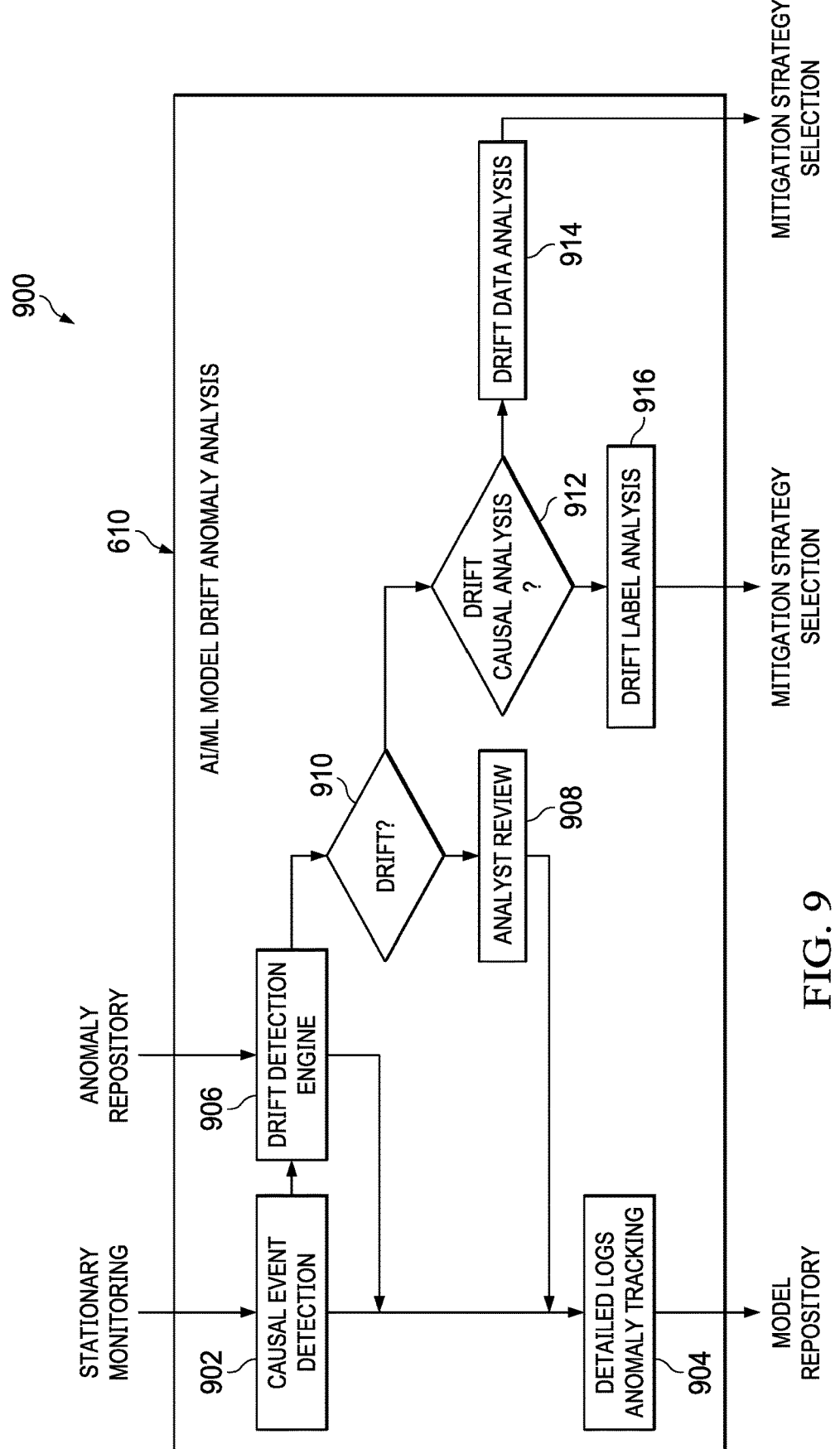
FIG. 9 is a diagram of an example of a system for anomaly analysis for drift analysis, according to some embodiments.

FIG. 9 is a diagram of an example of system 900 for anomaly analysis for drift analysis, according to some embodiments. System 900 refers to anomaly analysis 610 of FIG. 6 and it includes causal event detection 902, detailed logs anomaly tracking 904, drift detection engine 906, analyst review 908, drift decision block 910, drift causal analysis decision block 912, drift data analysis 914 and drift label analysis 916, each of which may be implemented in hardware or a suitable combination of hardware and software.

Causal event detection 902 may be implemented as one or more algorithms loaded from a data memory device into working memory of a processor, which cause the processor to perform causal event detection in data received from stationary monitoring 708 or other suitable data. In an example embodiment, stationary monitoring 708 may generate data that indicates that a causal event has occurred, and causal event detection 902 may generate an output that is received by drift detection engine 906 and data that is provided to detailed logs anomaly tracking 904.

Detailed logs anomaly tracking 904 may be implemented as one or more algorithms loaded from a data memory device into working memory of a processor, which cause the processor to perform detailed logs of anomaly tracking for drift detection, or other suitable operations. In an example embodiment, detailed logs anomaly tracking 904 may receive data from causal event detection 902, drift detection engine 906, analyst review 908 or other suitable data, and may generate data for model repository 808 or other suitable data.

Drift detection engine 906 may be implemented as one or more algorithms loaded from a data memory device into working memory of a processor, which cause the processor to perform drift detection in response to data received from anomaly repository 702, causal event detection 902, or other suitable data. In an example embodiment, drift detection engine 706 may determine whether drift has occurred that renders an AI/ML model inaccurate, and it may generate an output to drift decision block 910, detailed logs anomaly tracking 904, or other suitable data.

Analyst review 908 may be implemented as one or more algorithms loaded from a data memory device into working memory of a processor, which cause the processor to perform analyst review notification, tracking, and other suitable operations. In an example embodiment, analyst review 908 may generate a notification to an analyst when AI/ML model drift has been detected, may track the resolution or analysis of drift by the analyst and may perform other suitable operations. Analyst review 908 may generate output data for detailed logs anomaly tracking 904 or other suitable data.

Drift decision block 910 may be implemented as one or more algorithms loaded from a data memory device into working memory of a processor, which cause the processor to perform a drift decision process. In an example embodiment, drift decision block 910 may receive data from drift detection engine 906 and determine whether the data indicates that manual review is needed, that drift causal analysis is needed or that other processing is needed. If it is determined that manual review is needed, drift decision block 906 may generate data for analyst review 906, whereas if it is determined that drift causal analysis is needed, data may be generated for drift causal analysis decision block 912.

Drift causal analysis decision block 912 may be implemented as one or more algorithms loaded from a data memory device into working memory of a processor, which cause the processor to select drift data analysis 914, drift label analysis 916 or other suitable processes. In an example embodiment, drift data analysis 914 may be selected if drift data is present, and drift label analysis 916 may be selected if drift label analysis is needed.

Drift data analysis 914 may be implemented as one or more algorithms loaded from a data memory device into working memory of a processor, which cause the processor to perform drift data analysis processing. In an example embodiment, when drift is present, drift data analysis may be performed to identify one or more conditions that may be used to detect drift.

Drift label analysis 916 may be implemented as one or more algorithms loaded from a data memory device into working memory of a processor, which cause the processor to perform drift label analysis processing. In an example embodiment, when drift is present, drift label analysis may be performed to identify one or more labels that may be used to detect drift.

Prediction Confidence Using AI/ML Model Drift

In various applications, it is difficult to identify an AI/ML model that produces false positives with high prediction confidence. It is also difficult to know if sudden variances in model predictions are correct. To address these, and other issues, systems and methods described herein may utilize the output of data drift detection to modify or weigh AI/ML model prediction confidence scores. Additionally, or alternatively, systems and methods described herein may utilize the output of data drift detection to weight the actual output (e.g., the overall results) of an AI/ML model.

For example, in response to a negative drift detection (i.e., detection of the absence of drift), systems and methods may assign a higher weight to a model's confidence score, which indicates that the model's prediction and/or its prediction confidence is more likely to be accurate. Conversely, in response to a positive drift detection (i.e., detection of the presence of drift), these systems and methods may assign a lower weight to a model's confidence score (even if model's confidence is high), which indicates that the model's prediction and/or its prediction confidence is less likely to be accurate.

FIG. 10 is a diagram of an example of method 1000 for calculating AI/ML model prediction confidence using drift. In various embodiments, method 1000 may be performed, at least in part, by IHS 100 in response to the execution of program instructions configured to instantiate drift-based confidence scorer 1006. Particularly, method 1000 begins when an incoming stream of input data 1001 is received by AI/ML model 1002 drift detection component 1004 (e.g., an implementation of AI/ML model drift anomaly detection block 606 of FIG. 6) and by AI/ML model 1002.

Examples of AI/ML model 1002 may include, but are not limited to: regression workloads (e.g., Ordinary Least Squares Regression (OLSR), Linear Regression, Logistic Regression, Stepwise Regression, Multivariate Adaptive Regression Splines (MARS), Locally Estimated Scatterplot Smoothing (LOESS), etc.), instance-based workloads (e.g., k-Nearest Neighbor (kNN), Learning Vector Quantization (LVQ), Self-Organizing Map (SOM), Locally Weighted Learning (LWL), Support Vector Machines (SVM), etc.), regularization workloads (e.g., Ridge Regression, Least Absolute Shrinkage and Selection Operator (LASSO), Elastic Net, Least-Angle Regression (LARS), etc.), decision tree workloads (e.g., Classification and Regression Tree (CART), Iterative Dichotomizer 3 (ID3), C4.5 and C5.0, Chi-squared Automatic Interaction Detection (CHAID), Decision Stump, M5, Conditional Decision Trees, etc.), Bayesian workloads (e.g., Naive Bayes, Gaussian Naive Bayes, Multinomial Naive Bayes, Averaged One-Dependence Estimators (AODE), Bayesian Belief Network (BBN), Bayesian Network (BN), etc.), clustering workloads (e.g., k-Means, k-Medians, Expectation Maximization (EM), Hierarchical Clustering, Association Rule Learning Algorithms, etc.), association rule learning workloads (e.g., Apriori algorithm, Eclat algorithm, etc.), artificial neural network workloads (e.g., Perceptron, Multilayer Perceptrons (MLP), Back-Propagation, Stochastic Gradient Descent, Hopfield Network Radial Basis Function Network (RBFN), etc.), deep learning workloads (e.g., Convolutional Neural Network (CNN), Recurrent Neural Networks (RNNs), Long Short-Term Memory Networks (LSTMs), Stacked Auto-Encoders, Transformer Attention models, Deep Boltzmann Machine (DBM), Deep Belief Networks (DBN), etc.), dimensionality reduction workloads (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), etc.), ensemble workloads (e.g., Boosting, Bootstrapped Aggregation (Bagging), AdaBoost, Weighted Average (Blending), Stacked Generalization (Stacking), Gradient Boosting Machines (GBM), Gradient Boosted Regression Trees (GBRT), Random Forest, etc.), etc.

Method 1000 continues as drift detection component 1004 outputs drift metric(s) 1005 (e.g., a binary value, a decimal value, a percentual value, a range of values, a rank, etc.) to drift-based confidence scorer 1006. AI/ML model 1002 also outputs prediction, inference, and/or interpretation result(s) 1003, each associated with respective confidence score(s), to drift-based confidence scorer 1006.

To produce drift metric(s) 1005, drift detection component 1004 may perform a pre-model analysis to calculate a first metric based upon a variance of input data with respect to an input data norm, where the input data norm is established in the absence of drift. Drift detection component 1004 may also perform a post-model analysis to calculate a second metric based upon a variance of prediction or inference results with respect to a prediction or inference norm, where the prediction or inference norm is established in the absence of drift.

Drift detection component 1004 may then apply a first weight to the first metric, apply a second weight to the second metric, and calculate drift metric(s) 1005 as a weighted average of the first and second metrics. For example, in response to a determination that the AI/ML model is more susceptible to data drift than concept drift, the first weight may be greater than the second weight. Alternatively, in in response to a determination that the AI/ML model is more susceptible to concept drift than data drift, the second weight may be greater than the first weight. Moreover, drift detection component 1004 may also enable a user to change at least one of the first or second weights to further adjust the confidence score.

Drift-based confidence scorer 1006 modifies prediction, inference, and/or interpretation result(s) 1003 and/or their respective confidence score(s) based upon drift metric(s) 1005 to produce adjusted prediction, inference, and/or interpretation results 1007 and/or adjusted confidence score(s). For example, drift-based confidence scorer 1006 may utilize the output of data drift detection to weight model prediction confidence scores, such that negative drift detection assigns a higher weighting whereas positive drift detection results in a lower weighting.

To adjust the confidence score, drift-based confidence scorer 1006 may, in response to a determination that the drift is greater than a threshold value, reduce the confidence score proportionally to the drift and/or indicate that the associated prediction or inference is not trusted. Conversely, in response to a determination that the drift is smaller than the same (or a different) threshold value, drift-based confidence scorer 1006 may increase the confidence score proportionally to the drift and/or indicate that the associated prediction or inference is trusted. In some cases, drift-based confidence scorer 1006 may enable a user to select by how much drift determinations affect the confidence score, prediction, and/or inference (e.g., as an overall weight applied to a combination of pre- and post-model drift metrics).

In some embodiments, systems and methods described herein may identify drift with respect to an AI/ML model and may utilize the output of the drift detection to weigh model prediction scores. Negative drift detection assigns a higher weighting implying the model prediction confidence is more likely to be accurate. Positive drift detection would result in a lower weighting even if the model confidence is high. The weighting can apply to the overall results and/or individual confidence scores. The IHS can then generate a trust or do-not-trust output or an adjusted inference result.

Accordingly, systems and methods described herein may apply the results of drift detection to the final model prediction confidence scores and/or to the final observations of an AI/ML model, while supporting the basis for a framework of model accuracy improvements.

Data Characterization Using Drift Models

AI/ML models often require very large amounts of data for training and testing. Generally, training and testing processes involve cumbersome manual tasks, including a data classification process followed by tagging or annotation. However, hand-annotation of large volumes of data can present significant risks. Moreover, it would be more practical and less expensive to annotate data at the edge, nearest the source of the data collection.

The various characteristics, attributes, or parameters with which input data is tagged may be derived from many sources. For example, a source of characteristics may be derived from the data item as an object, without regard for the file type or contents. "Creation time," "size in bytes," etc. are examples of characteristics that may be obtained directly from the data. Another source of characteristics may include the "type" or "format" of a data file. For instance, an image data file may have associated characteristics such as "encoding," "dimensions," and so forth.

Yet another source of characteristics may include the actual contents of the data file itself. For example, a text file containing a chat transcript may be analyzed to extract named entities, derive sentiment, and so forth. Still another source of characteristics may include external sources (information may be derived from external sources by leveraging any of the previous sources to act as information to reference a completely external source). For instance, the time and location of surveillance footage of an area may be used to correlate police report data.

Particularly with respect to sensor data—that is, one or more data items obtained from a sensor (e.g., a camera, a microphone, a radar, etc.)—such data may be further characterized based upon attempts to identify discrete instances of selected class types within a defined data instance (e.g., identify all known objects in an image frame).

In addition to the foregoing, systems and methods described herein may also ascertain other aspects of the input data that provide significant value to subsequent processes, but that are not detectable with traditional techniques. In that regard, the term "hidden feature," as used herein, generally refers to a characteristic, attribute, or parameter of a data item that is not directly observable, detectable, and/or ascertainable from the data item itself.

In many cases, hidden features can affect an AI/ML model's performance. For example, the presence of rain can significantly impact the performance of a 2D object detection model, but a 2D detection model cannot determine the presence of rain. To address these, and other issues, systems and methods described herein may utilize drift detection techniques to enable the classification of a data item based on hidden features.

In contrast with traditional classification AI/ML models that focus on specific object type classification (e.g., car, dog, tree, etc.), systems and methods described herein may enable the characterization of data items based upon features such as, for example, weather conditions, lighting conditions, moods, emotions, intent, etc. In some cases, characterizations performed using the systems and methods described herein may be used to explain what a data item "is like," as opposed to what it "is."

In various embodiments, systems and methods described herein enable automated unsupervised data characterization, at an abstract level, which allows for categorization of causal conditions leading to drift. Particularly, these systems and methods may categorize conditions that are broader than specific object categories (e.g., dog, cat, car . . . ) to general abstract categories that are causal to drift mechanisms (i.e., raining, vehicle orientation . . . ). In some cases, identifying and leveraging the conditions and associated data distribution may enable proactive remediation of the root cause of drift by identifying causal conditional relationships.

Figure 11:
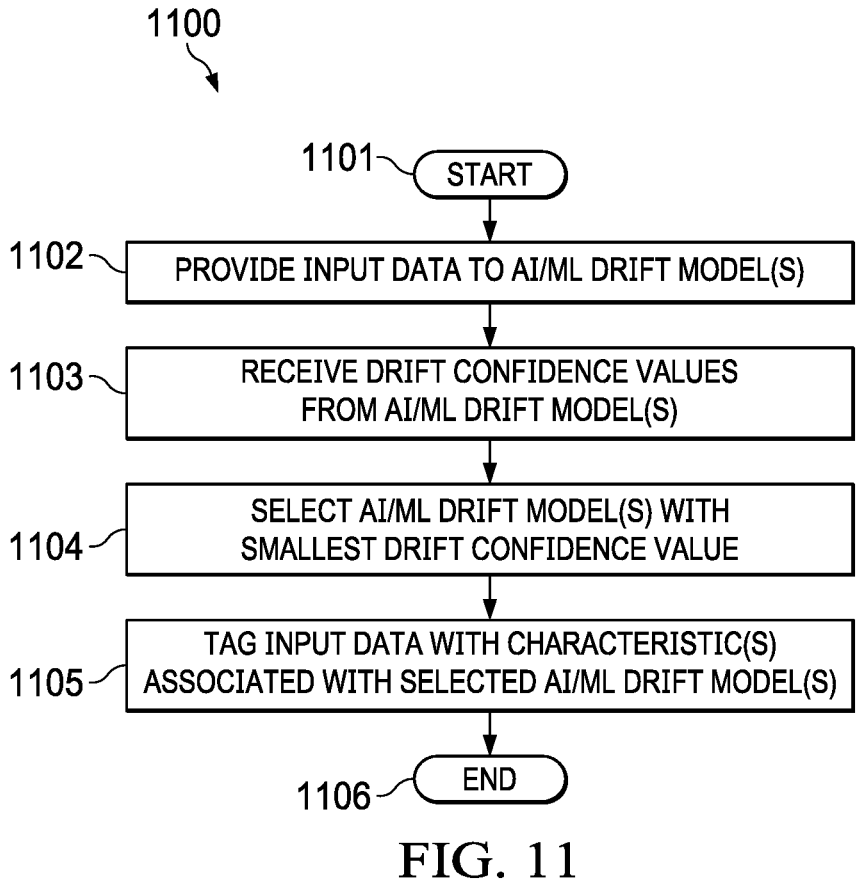
FIG. 11 is a diagram of an example of a method for unsupervised data characterization using drift models, according to some embodiments.

FIG. 11 is a diagram of an example of method 1100 for unsupervised data characterization using drift models. In some implementations, method 1100 may be performed, at least in part, by IHS 100 in response to the execution of program instructions configured to instantiate sensor data processor 502 of FIG. 5 and/or annotation processor 1501 of FIG. 15. Particularly, method 1100 starts at 1101.

At 1102, method 1100 receives input data (e.g., real input data, a training dataset, etc.) to be processed by one or more AI/ML drift detection model(s). At 1103, method 1100 receives drift confidence values from the AI/ML, drift detection model(s). At 1104, method 1100 selects, among the AI/ML drift detection model(s), at least one model with smallest drift confidence value. Then, at 1105, method 1100 tags the input data with one or more characteristics or attributes associated with the select AI/ML, drift detection model.

Method 1100 ends at 1106. Thereafter, a user may select a subset of the input data to train an AI/ML model based, at least in part, upon use of the tag (e.g., as search term, etc.).

In various embodiments, the tagged characteristics or attributes associated with the selected AI/ML drift detection model may represent a feature, quality, or process not detectable in the input data (e.g., a hidden feature). Each of the AI/ML drift detection model(s) may be trained with data known to have an otherwise hidden feature (e.g., rain), such that the amount and/or confidence of drift caused by other input data, when processed by an AI drift detection model, is indicative of similarly between the training data and the other input data.

To select an AI/ML drift detection model at 1104, method 1100 may, for example, determine that a drift metric (e.g., an amount of drift, a drift confidence score, etc.) output by the model is below a threshold value. At 1105, method 1100 may identify the input data as having the model's characteristic.

Additionally, or alternatively, to select the AI drift detection model at 1104, method 1100 may provide the input data to a first AI/ML drift detector and to a second AI/ML drift detector, where the first detector is associated with a first characteristic or hidden feature, and the second drift detector is associated with a second characteristic or hidden feature. Then, at 1105, method 1100 may: (a) in response to a determination that a first drift confidence score output by the first AI/ML drift detector is smaller than a second drift confidence score output by the second AI/ML drift detector, identify the input data as having the first characteristic; or (b) in response to a determination that the second drift confidence score output by the second AI/ML drift detector is smaller than the first drift confidence score output by the first AI/ML drift detector, identify the input data as having the second characteristic.

In some cases, method 1100 may identify hidden features from an extrinsic or external source based upon a location or a time of collection of the input data. For example, the external source may include a weather service, a news service, or the like. Additionally, or alternatively, the external source may include a Controller Area Network (CAN) bus message, and the second characteristic may include a state of a vehicle (e.g., speed, acceleration, breaking, fuel consumption, tire pressure, battery level, etc.) during data collection.

Figure 12:
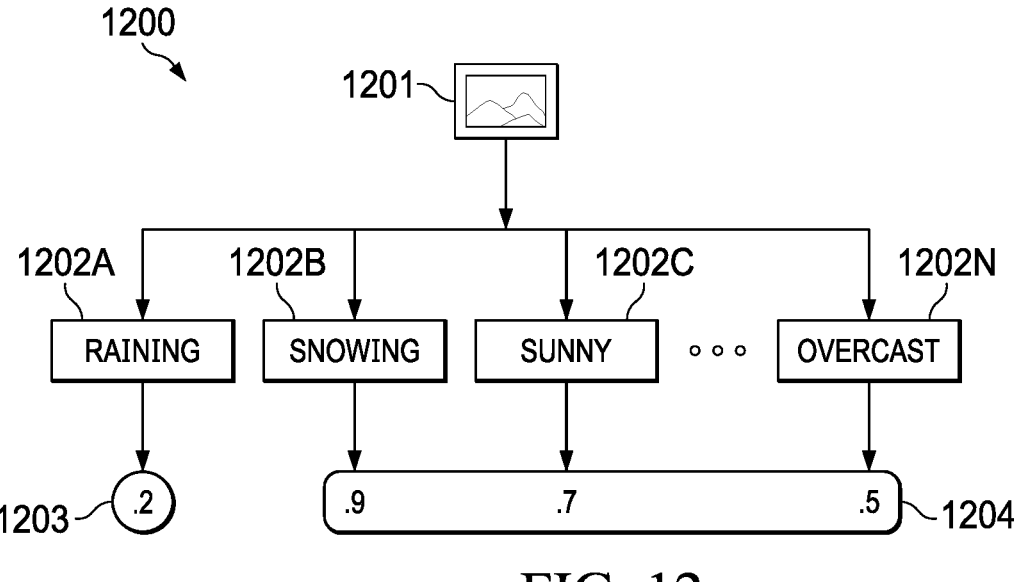
FIG. 12 is a diagram of an example implementation of a method for unsupervised data characterization using drift models, according to some embodiments.

FIG. 12 is a diagram of an example implementation 1200 of method 1100 for unsupervised data characterization using drift models. In implementation 1200, to create AI/ML drift models 1202A-N, a user may identify data instances in a training dataset known to contain hidden features such as, for example, "like" raining, "like" snowing, "like" sunny, "like" overcast, etc., and the user may train each of AI/ML drift models 1202A-N with respectively identified data.

Input data 1201 is received by AI/ML drift models 1202A-N, and each of AI/ML drift models 1202A-N produces a drift confidence value or other suitable metric. A voting mechanism may select the model with least drift 1203 (0.2), compared to 1204 (0.5, 0.4, and 0.9), and it may determine that the input data is "like raining" such that the input data can be tag with a raining label or attribute.

In some embodiments, drift thresholds may be used. For example, in implementation 1200, the smallest drift 1203 may also have to also be smaller than a maximum drift value (e.g., 0.3), above which the input data cannot be reliably characterized as having the hidden feature. Based on implementation 1200, it may be noted that input data tags may be modified "on the fly" and in the absence of costlier retraining procedures.

Multi-Observer, Consensus-Based Ground Truth

Systems and methods described herein enable ground truth auto-annotation of input data not otherwise collected or indicated as such. Generally, a single observer-based auto-annotation process would be highly dependent on the quality of the AI/ML model used to characterize the data and on the nature of the annotated data. Accordingly, to provide a reliable ground truth characterization of input data, systems and methods described herein may collect observations, inferences, predictions, and/or interpretations made by multiple devices or entities (e.g., sensors, cameras, computers, cars, etc.) in a shared space (e.g., a traffic intersection, a hotel lobby, etc.), and may aggregate those various observations to form a consensus observation.

In some cases, each device may have a different perspective of a common scene, and the consensus observation may be made for one or more areas of the scene where there is overlap. These devices may include heterogenous hardware (e.g., different cameras, different types of sensors, etc.) and/or their individual observations may be made using a heterogenous set of AWL models that share a common type of inference result (e.g., object detection). Data items giving rise to an inference that matches (or that are part of) the consensus observation may be tagged with a ground truth or consensus label.

Systems and methods described herein may utilize multi-observer, consensus-based ground truth of a common scene to detect, estimate, and/or mitigate drift. This can be accomplished, for example through multi-sensor networks (e.g., video, radar, and lidar in autonomous vehicles). Among the plurality of sensors in a given network, use of a common inference may be a requirement, and each sensor may have a different perspective or different sensory view. As such, these systems and methods may enable recognition of objects that may have drift due to obscuring data or different perspective and/or orientation. Moreover, drift may be estimated using different models to interpret the multi-observer data. Accordingly, these systems and methods may further be used to reduce intrinsic model bias.

Figure 13:
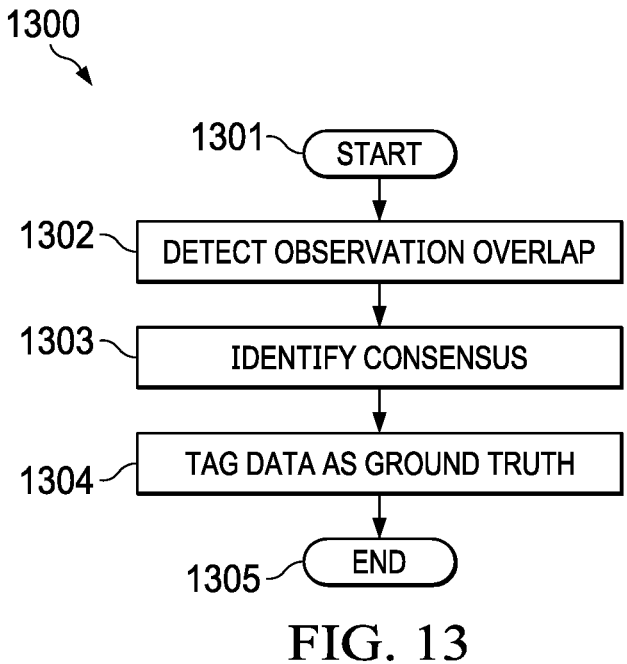
FIG. 13 is a diagram of an example of a method for generating multi-observer, consensus-based ground truth tags, according to some embodiments.

FIG. 13 is a diagram of an example of method 1300 for generating multi-observer ground truth or consensus tags for input data. In some implementations, method 1300 may be performed, at least in part, by IHS 100 in response to the execution of program instructions configured to instantiate sensor data processor 502 of FIG. 5 and/or annotation processor 1501 of FIG. 15. Particularly, method 1300 starts at 1301.

At 1302, method 1300 may detect an observation overlap between different devices. Each device may have a distinct set of properties, and these devices can be homogeneous (e.g., same cameras and models) or heterogeneous (e.g., different cameras and/or models). In some cases, the use of multisensory inputs (e.g., camera images and radar-derived images or other data) can lower rates of false negative and/or positive inferences.

Method 1300 may calculate an observation overlap based upon each device's properties. For example, to identify or calculate such an overlap, method 1300 may consider a device's location, focal length (e.g., in the case of an optical camera), pose, etc.

At 1303, a consensus may be identified among inferences produced with data collected by different device. To identify the consensus, method 1300 may compare inferences of a same type (e.g., object detection, etc.). To the extent a minimum number of inferences may match each other, for example, within selected upper and lower thresholds, these matching inferences may be identified as part of the consensus within the observation overlap.

In some cases, to identify a consensus, method 1300 may further weigh or adjust the value of inferences obtained from each device or AI/ML model differently based upon selected observer and/or scene characteristics. For instance, these weights may be modified based on sensor quality, model performance, and/or other observational qualities (e.g., the presence of an occluded clear line of sight, etc.).

Additionally, or alternatively, method 1300 may apply a weight to an AI/ML model inference based a prediction confidence of an AI/ML model's inference. The confidence may be modified based upon drift detected during operation of the AI/ML model. For example, in response to a determination that the drift is greater than a threshold value, method 1300 may reduce the confidence proportionally to the drift.

At 1304, method 1300 may tag the input data giving rise to inferences that match the consensus with a ground truth or consensus label. Moreover, method 1300 may tag the data with additional parameters indicative of how the consensus was reached, such as, for example: the minimum number of observations/devices required to reach a consensus, the number of observations/devices used to reach the consensus, a total of number of participating devices, identification and/or types of such devices, threshold values used to define the observation overlap and/or whether an inference result matches another, etc.

In some implementations, once a dataset includes the ground truth or consensus tag, a user may select a subset of it using the tag and may re-train an AI/ML model with the subset. Method 1300 ends at 1305.

Figure 14:
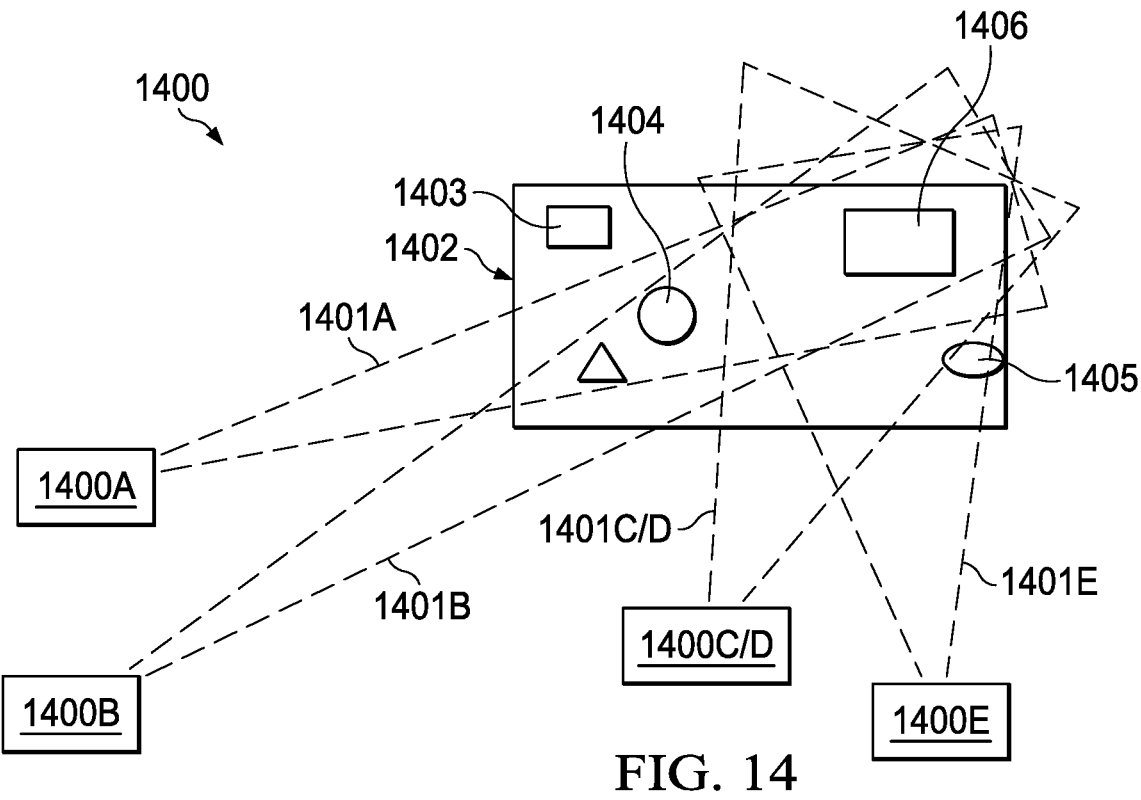
FIG. 14 is a diagram of an example implementation of a method for generating multi-observer, consensus-based ground truth tags, according to some embodiments.

FIG. 14 is a diagram of example implementation 1400 of method 1300 for generating multi-observer, consensus-based ground truth or consensus tags. Particularly, devices 1400A-E are disposed at different locations; except for devices 1400C and 1400D, which are co-located. In some cases, in response to a determination that two or more devices are co-located, redundant inferences made using their data may each receive a lower weighting. Each device 1400A-E has a respective field-of-view (FOV) 1401A-E with respect to physical space or Region-of-Interest (ROI) 1402 where objects 1403-1406 may be present and/or detected.

In this example implementation, object 1403 goes undetected because it falls outside of FOVs 1401A-E. Object 1404 is detected by devices 1400A and 1400B. Object 1405 is at least partially detected by devices 1400C, 1400D, and 1400E. Meanwhile, object 1406 is detected by all of devices 1400A-E. In this case, a conservative annotation policy may establish that input data giving rise to the detection of object 1406 by devices 1400A-E be tagged with ground truth or consensus labels. A less conservative annotation policy may also include input data giving rise to the detection of object 1404, for example.

As such, systems and methods described herein may employ a multi-observer approach to auto-annotate input data with ground truth labels by calculating of overlapping ROI(s) based on observers and sensor characteristics, further made robust by using heterogenous models to reduce bias.

These systems and methods may consider multiple vantage points help to reduce AI/ML model bias in automated annotation processes.

Automated Identification of Training Datasets

The ubiquity of sensors in modern devices creates significant amounts of data and the trend is for more volume and complexity. This data can be leveraged to train AI/ML models to enhance their performance, but it is a practical necessity to cull this information to identify data that is applicable for specific model training goals.

However, the state-of-the-art annotation process is largely manual and mostly relies on simple tagging only (e.g., GPS, time, etc.). To address these, and other issues, systems and methods described herein provide automated, large-scale tagging and subsequent identification of pertinent training sets.

Moreover, embodiments of systems and methods enable the identification of conditions causal to drift, and it may utilize characterization models based on conditions generating drift that can identify objects that are causal to drift. These systems and methods may use automated techniques, such as model optimization for conditions generating drift and metadata that can indicate causes of drift, to identify object sets that can be incorporated into training datasets for drift mitigation.

Figures 15, 17:
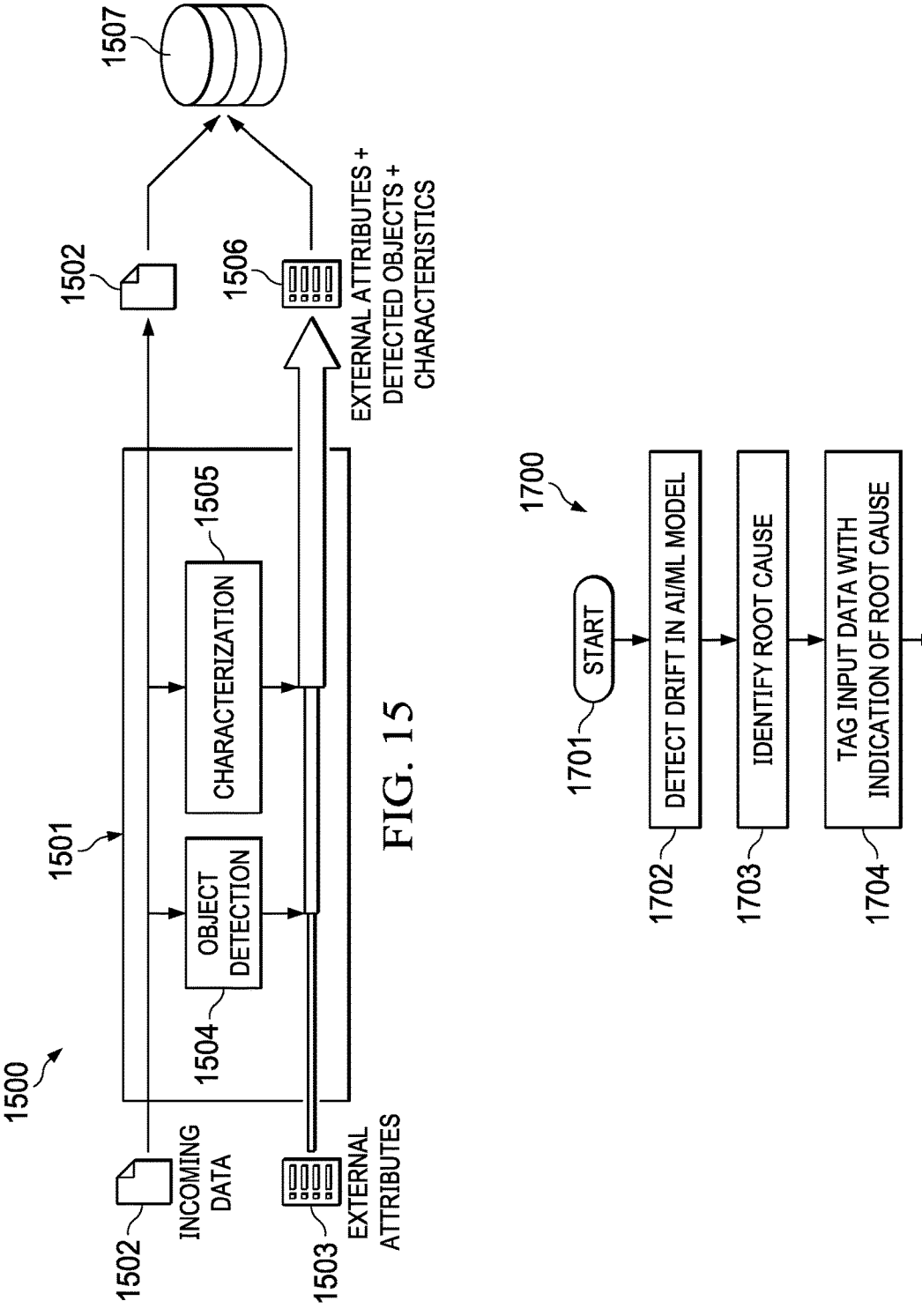
FIG. 15 is a diagram of an example of a method for generating rich attributes for the automated identification of training datasets, according to some embodiments.
FIG. 17 is a diagram of an example of a method for drift remediation using causal methods, according to some embodiments.

FIG. 15 is a diagram of an example of method 1500 for generating rich attributes 1506 for the automated identification of training datasets. In some implementations, method 1500 may be performed, at least in part, by IHS 100 in response to the execution of program instructions configured to instantiate annotation processor 1501. In operation, annotation processor 1501 receives incoming data 1502 from one or more devices, and external attributes 1503 from external sources (e.g., a CAN controller, weather service, etc.). At 1504, annotation processor 1501 applies any suitable AI/ML characterization model to incoming data 1502, for example, to identify objects observable therein, and incoming data 1502 is tagged with an indication of such objects.

At 1505, annotation processor 1501 performs an additional data characterization process to further tag relevant portions of incoming data 1502 with other information (e.g., drift information, hidden feature information, ground truth or consensus information, etc.). Data 1502 is tagged with external attributes 1503, detected objects 1504, and other characteristics 1505 stored as rich attributes 1506 in training database 1507.

To use rich-attribute training database 1507, a user may identify desired training attributes. For example, if drift is found in incoming data 1502, the user may select a subset of the training data that matches the attributes of the drift-inducing data, and it may re-train an AI/ML model using the selected training data.

Figure 16:
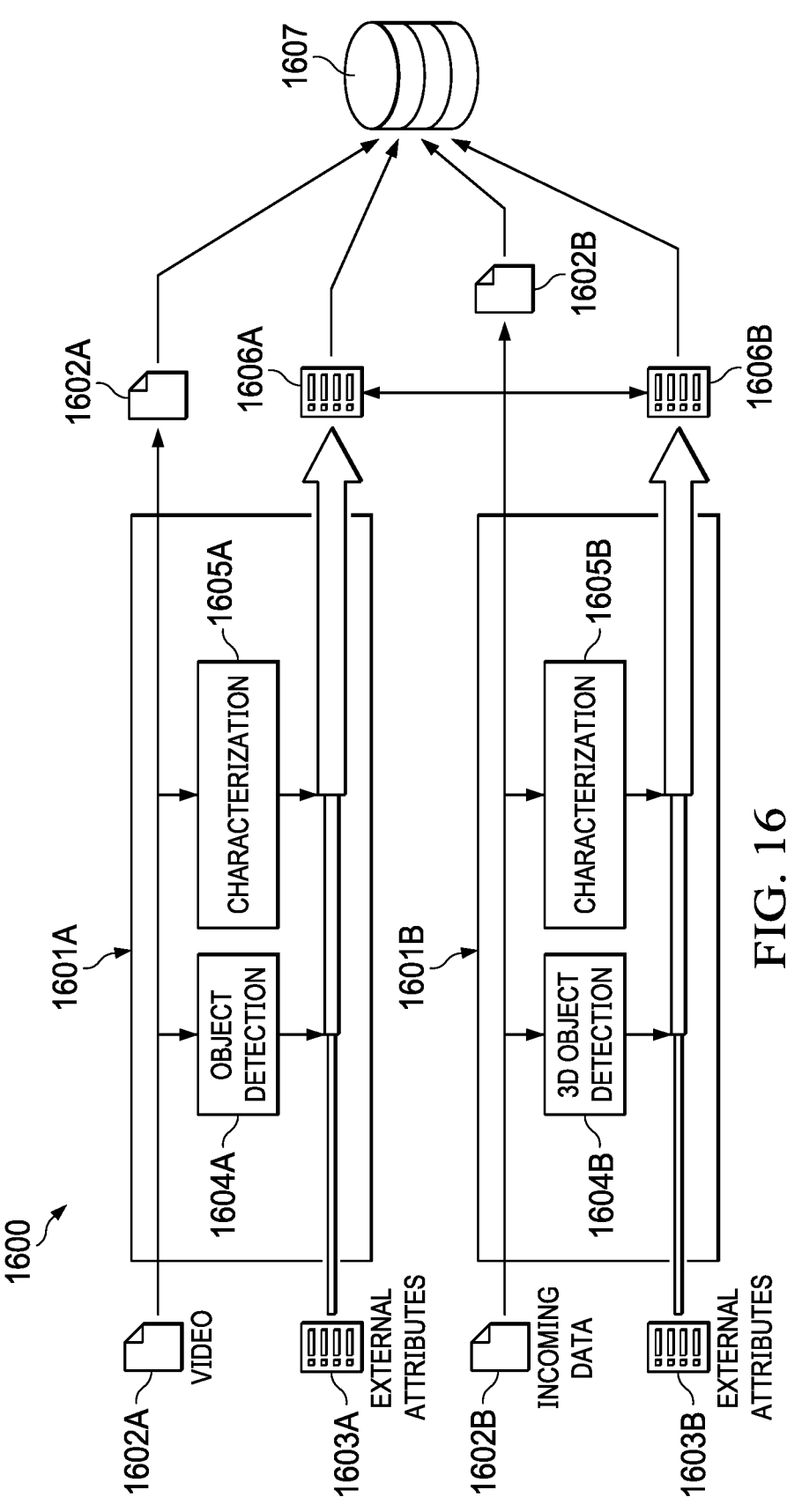
FIG. 16 is a diagram of an example of a method for generating rich attributes using data fusion, according to some embodiments.

FIG. 16 is a diagram of an example of method 1600 for generating rich attributes using data fusion. Method 1600 may be performed, at least in part, by IHS 100 in response to the execution of program instructions configured to instantiate annotation processors 1601A and 1602B. Particularly, annotation processor 1601A receives incoming data 1602A from one or more devices, and external attributes 1603A from one or more external sources. Meanwhile, annotation processor 1601B receives incoming data 1602B from one or more devices, and external attributes 1603B from the same or other external sources. In some cases, incoming data 1602A and 1602B may be related (e.g., time or geo synchronized) but may belong to a different class (e.g., collected by different devices, different types of devices, etc.).

At 1604A, annotation processor 1601A applies an AI/ML model to incoming data 1602A (e.g., from a camera) to identify 2D objects, and incoming data 1602A is tagged with an indication of the detected 2D objects. At 1604B, annotation processor 1601B applies a different AI/ML model to incoming data 1602B (e.g., from a LIDAR device) to identify 3D objects (or obstacles), and incoming data 1602B is tagged with an indication of the detected 3D objects.

At 1605A, annotation processor 1601A performs a data characterization process to tag relevant portions of incoming data 1602A with additional information (e.g., drift information, hidden feature information, ground truth or consensus information, etc.). At 1605B, annotation processor 1601B performs another data characterization process to further tag relevant portions of incoming data 1602B with additional information (e.g., drift information, hidden feature information, ground truth or consensus information, etc.).

Input data 1602A is tagged with external attributes 1603A and 1603B, detected objects 1604A and 1604B, and other characteristics 1605A and 1605B stored as rich attributes in training database 1607. Similarly, input data 1602B is tagged with external attributes 1603A and 1603B, detected objects 1604A and 1604B, and other characteristics 1605A and 1605B stored as rich attributes in training database 1607.

As such, systems and methods described herein may be used to generate rich attributes as part of an automatable ML/AI lifecycle management system. In addition to the parameters discussed above, once training database 1607 is built, subsets of training data may also be selected, for example, based upon population size, distribution of attributes, time windows, geofence, etc.

Drift Remediation Using Causal Methods

Upon detection of drift, remedial action may be taken to address AI/ML model deficiencies. Current state-of-the-art is focused on techniques that identify the drift-inducing data without understanding the causal relationship. This results in a manual method that necessarily requires a lengthy and costly process to fully identify candidate data and retrain the AI/ML model. The AI/ML model must be re-evaluated to assess its performance and to make sure the training was effective. Yet many applications require timely resolution of drift issues (e.g., autonomous vehicles, robotics, medical diagnostics, manufacturing processes, etc.).

To address these, and other issues, systems and methods described herein may employ causal learning methods to detect, identify, and remediate potential root causes of drift. Causal methods are based on machine reasoning systems and can be used to autonomically discover underlying reasons for drift. It can be very difficult to identify the root cause of drift. Causal reasoning methods can detect directed acyclic graphical structures which can indicate data that is driving the inferential confidence score to decline. Causal reasoning models can be trained and autonomically operate to identify high probability data using graphical or structural inferences. In addition, a causal model includes the root cause that allows the understanding of most effective remediation actions.

Particularly, these systems and methods may: assess root causes through heuristic methods to determine candidate data for further offline model training, remediate current performance by making online model adjustments to address probable drift root causes, and use AB or Canary testing methods (e.g., split testing or bucket testing) to determine efficacy of near-term adjustments. If the near-term adjustments are deemed satisfactory, these systems and methods may deploy the AI/ML model adjustments and release the data for offline training.

FIG. 17 is a diagram of an example of method 1700 for drift remediation using causal methods. In some embodiments. Method 1700 may be performed, at least in part, by IHS 100 in response to the execution of program instructions configured to instantiate AI/ML model drift anomaly analysis component 610 of FIG. 6. Particularly, method 1700 starts at 1701.

At 1702, method 1700 detects drift during the operation of an AI/ML model. At 1703, method 1700 machine reasoning/causal learning methods to isolate potential root cause(s) of the detected drift, assessed with heuristic methods. For example, method 1700 may employ a library or toolkit (e.g., DoWhy, ALICE, etc.) configured to perform causal inferences that support modeling and testing of causal assumptions, combining graphical models and potential outcome frameworks. In some cases, a root cause may include or be represented by a data pattern in the input data that produces the drift. At 1704, method 1700 tags drift-inducing input data with an indication of the root cause. Method 1700 ends at 1705.

In some implementations, method 1700 may further identify subsets of input data as candidates for offline model training. Attempts to remediate current A/ML model performance may be performed, for example, with online or on-the-fly small batch training optimization and evaluation, and by implementing AB testing to determine the efficacy of near-term adjustments.

For example, to determine that the online training process is successful, it may be verified that a re-trained instance of an AI/ML model produces inferences with higher confidence than an original AI model. Additionally, or alternatively, it may be verified that the re-trained instance of the AI/ML model produces less drift than the original AI/ML model.

If the online training process is effective, the identified dataset may be released for supervised offline training, and AI/ML model adjustments may be deployed. Conversely, if online training is not effective, offline training may be used.

As such, methods described herein may employ causal reasoning techniques that focus on machine reasoning versus statistical learning approaches. These systems and methods may learn inference confidence scoring patterns, as well as input data patterns, and may identify high-correlation and variance distributions to understand important common factors that are causal for the drift. These factors can be addressed at a categorical level to address the root cause, as opposed to merely the symptoms of AI drift. These systems and methods enable autonomic procedures for addressing drift.

Systems and methods described herein provide a hybrid solution integrating causal machine reasoning and learning methods to address why drift happens. Insights obtained from this approach can be incorporated into model design to render them less susceptible to drift. Moreover, these systems and methods are amenable to online processing, thus allowing for flexible use in system deployment.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes may be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
identify drift with respect to a trained Artificial Intelligence (AI) or Machine Learning (ML) model, based, at least in part, on both a pre-model analysis of at least a variance of input data, and a post-model analysis of an inference result, wherein identify drift further comprises:
provide at least a portion of the input data to a plurality of AI/ML drift detection models;

receive respective drift confidence values from the plurality of AI/ML drift detection models;

select at least one AI/ML drift detection model that provided a smallest drift confidence value among the respective drift confidence values; and tag the input data with a characteristic label associated with the selected AI/ML drift detection model, wherein the characteristic comprises a hidden feature not detectable in the input data;

calculate a weighted average of a first metric from the pre-model analysis and a second metric from the post-model analysis, wherein a first weight is applied to the first metric, a second weight is applied to the second metric, and at least one of the first weight or the second weight is user-configurable;

adjust a confidence score of a prediction produced by the AI or ML model based, at least in part, on the weighted average of the first and second metrics;

modify the prediction based, at least in part, upon the identified drift; and in response to a determination that drift exceeds a threshold, indicate an associated prediction is not trusted and initiate a pipeline that comprises corrective retrain, test, and deployment of a revised model based at least in part on a selected subset of tagged input data.

2. The IHS of claim 1, wherein the trained AI or ML model comprises at least one of: a Linear Regression model, a Deep Neural Network model, a Logistic Regression model, a Decision Tree model, a Linear Discriminant Analysis model, a Naive Bayes model, a Support Vector Machines model, a Learning Vector Quantization model, a K-nearest Neighbors model, or a Random Forest model.

3. The IHS of claim 1, wherein the program instructions, upon execution, further cause the IHS to perform the pre-model analysis based, at least in part, upon calculation of the variance of input data during inference with respect to an input data norm, and wherein the input data norm is established during training in absence of drift.

4. The IHS of claim 1, wherein the program instructions, upon execution, further cause the IHS to perform the post-model analysis based, at least in part, upon a prediction or inference norm established for output data from the AI or ML model during training, and output data from the trained AI or ML model during inference, wherein the program instructions, upon execution, further cause the IHS to calculate the second metric based, at least in part, upon a variance of prediction or inference results output from the AI or ML model during inference with respect to the prediction or inference norm, and wherein the prediction or inference norm is established during training in absence of drift.

5. The IHS of claim 1, wherein the program instructions, upon execution, further cause the IHS to adjust the confidence score proportionally to the drift.

6. The IHS of claim 1, wherein in response to a determination that the trained AI or ML model is more susceptible to data drift than concept drift, the first weight is greater than the second weight.

7. The IHS of claim 1, wherein in response to a determination that the trained AI or ML model is more susceptible to concept drift than data drift, the second weight is greater than the first weight.

8. The IHS of claim 1, wherein in response to a change of the at least one of the first weight or the second weight, the program instructions, upon execution, further cause the IHS to further adjust the confidence score.

9. The IHS of claim 1, wherein the program instructions, upon execution, further cause the IHS to train the AI or ML model based, at least in part, on training data that comprises sensor data that has data characteristics, attributes, or tags identified in discrete instances of selected class types within the training data, wherein the training data comprises at least a subset of the tagged input data selected based on the characteristic associated with the selected AI/ML drift detection model.

10. The IHS of claim 1, wherein to adjust the confidence score, the program instructions, upon execution, further cause the IHS to reduce the confidence score proportionally to the drift in response to a determination that the drift is greater than a threshold value.

11. The IHS of claim 1, wherein to adjust the confidence score, the program instructions, upon execution, further cause the IHS to indicate that the prediction or inference be trusted in response to a determination that the drift is smaller than a threshold value.

12. The IHS of claim 1, wherein to adjust the confidence score, the program instructions, upon execution, further cause the IHS to increase the confidence score proportionally to the drift in response to a determination that the drift is smaller than a threshold value.

13. The IHS of claim 1, wherein to adjust the confidence score, the program instructions, upon execution, further cause the IHS to enable a user to select by how much the drift affects the confidence score.

14. The IHS of claim 1, wherein the program instructions, upon execution, further cause the IHS to determine a plurality of inferences produced by the AI or ML model based on sensor data from a respective plurality of sensor devices, wherein modify the prediction further comprises individually adjust each inference of the plurality of inferences based, at least in part, on a location of a respective sensor device of the respective plurality of sensor devices, and wherein the program instructions, upon execution, further cause the IHS to:

determine an observation overlap between at least two sensor devices based at least in part on respective device properties;

identify a consensus among inferences produced from sensor data collected within the observation overlap; and tag input data that give rise to inferences that match the consensus with a ground-truth label, wherein the selected subset of tagged input data is further selected based at least in part on the ground-truth label.

15. A hardware memory device having program instructions stored thereon that, upon execution, cause an Information Handling System (IHS) to:

determine a plurality of inferences produced by a trained Artificial Intelligence (AI) or Machine Learning (ML) model based on sensor data from a respective plurality of sensor devices;

identify drift with respect to the trained AI or ML model, based, at least in part, on both a pre-model analysis of at least a variance of input data, and a post-model analysis of the plurality of inferences, wherein identify drift further comprises:

provide at least a portion of the input data to a plurality of AI/ML drift detection models;

receive respective drift confidence values from the plurality of AI/ML drift detection models;

select at least one AI/ML drift detection model that provided a smallest drift confidence value among the respective drift confidence values; and tag the input data with a characteristic label associated with the selected AI/ML drift detection model, wherein the characteristic comprises a hidden feature not detectable in the input data;

calculate a weighted average of a first metric from the pre-model analysis and a second metric from the post-model analysis, wherein a first weight is applied to the first metric, a second weight is applied to the second metric, and at least one of the first weight or the second weight is user-configurable;

adjust a confidence score of a prediction produced by the AI or ML model based, at least in part, on the weighted average of the first and second metrics;

modify the prediction based, at least in part, upon the identified drift, wherein modify the prediction further comprises individually adjust each inference of the plurality of inferences based, at least in part, on a location of a respective sensor device of the respective plurality of sensor devices; and in response to a determination that drift exceeds a threshold, indicate an associated prediction is not trusted and initiate a pipeline that comprises corrective retrain, test, and deployment of a revised model based at least in part on a selected subset of tagged input data.

16. The hardware memory device of claim 15, wherein to adjust the confidence score, the program instructions, upon execution, further cause the IHS to, in response to a determination that the drift is greater than a first threshold value, reduce the confidence score.

17. The hardware memory device of claim 16, wherein to adjust the confidence score, the program instructions, upon execution, further cause the IHS to, in response to a determination that the drift is smaller than a second threshold value, increase the confidence score.

18. A method, comprising:

determining a plurality of inferences produced by a respective plurality of trained Artificial Intelligence (AI) or Machine Learning (ML) models based on sensor data from a plurality of sensor devices;

identifying drift with respect to the plurality of trained AI or ML models, based, at least in part, on both a pre-model analysis of at least a variance of input data, and a post-model analysis of the plurality of inferences, wherein identifying drift further comprises:

providing at least a portion of the input data to a plurality of AI/ML drift detection models;

receiving respective drift confidence values from the plurality of AI/ML drift detection models;

selecting at least one AI/ML drift detection model having a smallest drift confidence value among the respective drift confidence values; and tagging the input data with a characteristic label associated with the selected AI/ML drift detection model, wherein the characteristic comprises a hidden feature not detectable in the input data;

calculating a weighted average of a first metric from the pre-model analysis and a second metric from the post-model analysis, wherein a first weight is applied to the first metric, a second weight is applied to the second metric, and at least one of the first weight or the second weight is user-configurable;

adjusting a confidence score of a prediction produced by at least one AI or ML model based, at least in part, on the weighted average of the first and second metrics;

modifying the prediction based, at least in part, upon the identified drift, wherein modifying the prediction further comprises individually adjusting each inference of the plurality of inferences based, at least in part, on a location of a respective sensor device of the respective plurality of sensor devices; and in response to determining that drift exceeds a threshold, indicating an associated prediction is not trusted and initiating a pipeline including corrective retraining, testing, and deployment of a revised plurality of AI or ML models using a selected subset of tagged input data.

19. The method of claim 18, wherein modifying the prediction further comprises indicating that the prediction is not trusted in response to the drift being greater than a first threshold value.

20. The method of claim 19, wherein modifying the prediction further comprises indicating that the prediction is trusted in response to the drift being smaller than a second threshold value.

* * * * *